United States Patent
Hannuksela et al.

(10) Patent No.: US 10,979,727 B2
(45) Date of Patent: Apr. 13, 2021

(54) APPARATUS, A METHOD AND A COMPUTER PROGRAM FOR VIDEO CODING AND DECODING

(71) Applicant: Nokia Technologies Oy, Espoo (FI)

(72) Inventors: Miska Hannuksela, Tampere (FI); Jani Lainema, Tampere (FI); Alireza Aminlou, Tampere (FI); Ramin Ghaznavi Youvalari, Tampere (FI)

(73) Assignee: Nokia Technologies Oy, Espoo (FI)

( * ) Notice: Subject to any disclaimer, the term of this patent is extended or adjusted under 35 U.S.C. 154(b) by 180 days.

(21) Appl. No.: 16/307,626

(22) PCT Filed: Jun. 15, 2017

(86) PCT No.: PCT/FI2017/050448
§ 371 (c)(1),
(2) Date: Dec. 6, 2018

(87) PCT Pub. No.: WO2018/002425
PCT Pub. Date: Jan. 4, 2018

(65) Prior Publication Data
US 2019/0297339 A1    Sep. 26, 2019

(30) Foreign Application Priority Data
Jun. 30, 2016  (FI) ...................................... 20165547

(51) Int. Cl.
*H04N 19/105*   (2014.01)
*H04N 19/33*    (2014.01)
(Continued)

(52) U.S. Cl.
CPC .......... *H04N 19/33* (2014.11); *H04N 19/105* (2014.11); *H04N 19/129* (2014.11);
(Continued)

(58) Field of Classification Search
CPC .. H04N 19/105; H04N 19/129; H04N 19/132; H04N 19/167; H04N 19/174;
(Continued)

(56) References Cited

U.S. PATENT DOCUMENTS

| 7,379,496 B2 | 5/2008 | Holcomb et al. |
| 2006/0034529 A1 | 2/2006 | Park et al. |

(Continued)

FOREIGN PATENT DOCUMENTS

| EP | 1064817 A1 | 1/2001 |
| JP | 2002-312778 A | 10/2002 |

(Continued)

OTHER PUBLICATIONS

Yu, M et al. "Content Adaptive Representations of Omnidirectional Videos for Cinematic Virtual Reality" Proceedings of the 3rd International Workshop on Immersive Media ExperiencesOct. 2015 pp. 1-6 https://doi.org/10.1145/2814347.2814348 (Year: 2015).*

(Continued)

*Primary Examiner* — William C Vaughn, Jr.
*Assistant Examiner* — Naod W Belai
(74) *Attorney, Agent, or Firm* — Alston & Bird LLP

(57) ABSTRACT

A method comprising: decoding, from a bitstream, a first encoded region of first picture into a first preliminary reconstructed region; forming a first reconstructed region from the first preliminary reconstructed region, wherein the forming comprises resampling and/or rearranging the first preliminary reconstructed region, wherein the rearranging comprises relocating, rotating and/or mirroring; and decoding at least a second region, wherein the first reconstructed region is used as a reference for prediction in decoding the at least second region and the second region either belongs to a second picture and is spatially collocated with the first reconstructed region or belongs to the first picture.

20 Claims, 13 Drawing Sheets

(51) Int. Cl.
| | |
|---|---|
| H04N 19/167 | (2014.01) |
| H04N 19/174 | (2014.01) |
| H04N 19/51 | (2014.01) |
| H04N 19/176 | (2014.01) |
| H04N 19/129 | (2014.01) |
| H04N 19/503 | (2014.01) |

(52) U.S. Cl.
CPC ......... *H04N 19/167* (2014.11); *H04N 19/174* (2014.11); *H04N 19/176* (2014.11); *H04N 19/51* (2014.11); *H04N 19/503* (2014.11)

(58) Field of Classification Search
CPC .... H04N 19/176; H04N 19/33; H04N 19/503; H04N 19/51; H04N 19/59; H04N 19/597
USPC .................................................. 375/240.12
See application file for complete search history.

(56) References Cited

U.S. PATENT DOCUMENTS

| | | |
|---|---|---|
| 2015/0264259 A1 | 9/2015 | Raghoebardajal et al. |
| 2016/0112713 A1 | 4/2016 | Russell |
| 2016/0142697 A1* | 5/2016 | Budagavi ............. H04N 13/156 348/43 |

FOREIGN PATENT DOCUMENTS

| | | |
|---|---|---|
| WO | 00/08889 A1 | 2/2000 |
| WO | 2011/077343 A1 | 6/2011 |
| WO | 2012/012584 A1 | 1/2012 |
| WO | 2015/027105 A1 | 2/2015 |
| WO | 2016/064862 A1 | 4/2016 |
| WO | 2016/076680 A1 | 5/2016 |
| WO | 2017/127816 A1 | 7/2017 |
| WO | WO-2017127816 A1 * | 7/2017 ......... H04N 5/23238 |
| WO | 2017/162911 A1 | 9/2017 |

OTHER PUBLICATIONS

J. Li, Z. Wen, S. Li, Y. Zhao, B. Guo and J. Wen, "Novel tile segmentation scheme for omnidirectional video," 2016 IEEE International Conference on Image Processing (ICIP), Phoenix, AZ, 2016, pp. 370-374, doi: 10.1109/ICIP.2016.7532381. Novel tile segmentation scheme for omnidirectional video (Year: 2016).*

Ghanzavi, 360-Degree Panoramic Video Coding Master of Science, Tampere University of Technology, Aug. 2016. Applicants own thesis 56 pages. (Year: 2016).*

Extended European Search Report received for corresponding European Patent Application No. 17819411.4, dated Jan. 29, 2020, 12 pages.

Choi, "Draft Version of Omnidirectional Media Application Format (OMAF) WD", ISO/IEC JTC1/SC29/WG 11 MPEG2016/M38855, May 2016, 19 pages.

Yu et al., "Content Adaptive Representations of Omnidirectional Videos for Cinematic Virtual Reality", Proceedings of the 3rd International Workshop on Immersive Media Experiences, Oct. 30, 2015, pp. pp. 1-6.

Schulzrinne et al., "RTP: A Transport Protocol for Real-Time Applications", RFC 3550, Network Working Group, Jul. 2003, pp. 1-89.

"Video Coding for Low Bit Rate Communication", Series H: Audiovisual and Multimedia Systems, Infrastructure of audiovisual services—Coding of moving Video, ITU-T Recommendation H.263, Jan. 2005, 226 pages.

"Advanced Video Coding for Generic Audiovisual services", Series H: Audiovisual and Multimedia Systems, Infrastructure of audiovisual services—Coding of moving Video, Recommendation ITU-T H.264, Feb. 2016, 807 pages.

"High Efficiency Video Coding", Series H: Audiovisual and Multimedia Systems, Infrastructure of audiovisual services—Coding of moving video, Recommendation ITU-T H.265, Apr. 2015, 634 pages.

"Parameter Values for Ultra-High Definition Television Systems for Production and International Programme Exchange", Recommendation ITU-R BT.2020-2, Oct. 2015, 8 pages.

"Parameter Values for the HDTV Standards for Production and International Programme Exchange", Recommendation ITU-R BT.709-6, Jun. 2015, 19 pages.

Office action received for corresponding Finland Patent Application No. 20165547, dated Dec. 16, 2016, 10 pages.

Youvalari, "360-Degree Panoramic Video Coding", Thesis, 2016, 68 pages.

Li et al., "Novel Tile Segmentation Scheme for Omnidirectional Video", IEEE International Conference on Image Processing (ICIP), Sep. 25-28, 2016, pp. 370-374.

International Search Report and Written Opinion received for corresponding Patent Cooperation Treaty Application No. PCT/FI2017/050448, dated Dec. 20, 2017, 15 pages.

Office Action for European Patent Application No. 17819411.4 dated Jan. 12, 2021, 6 pages.

* cited by examiner

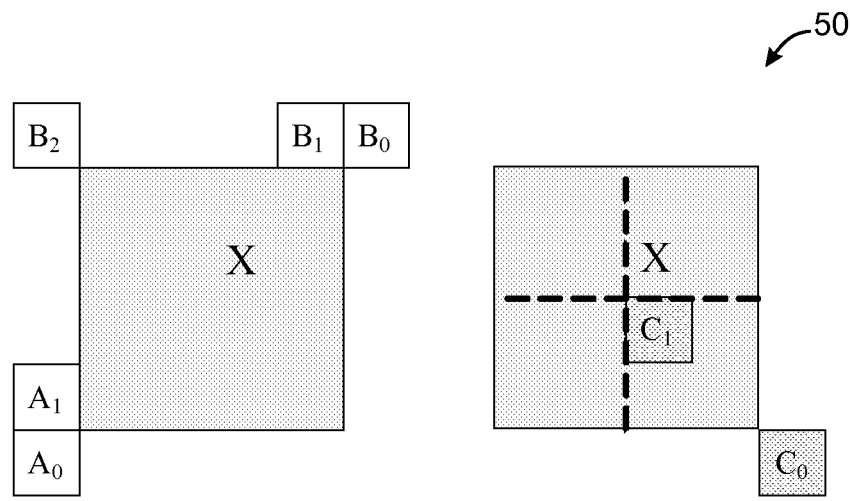
Fig.5a    Fig.5b
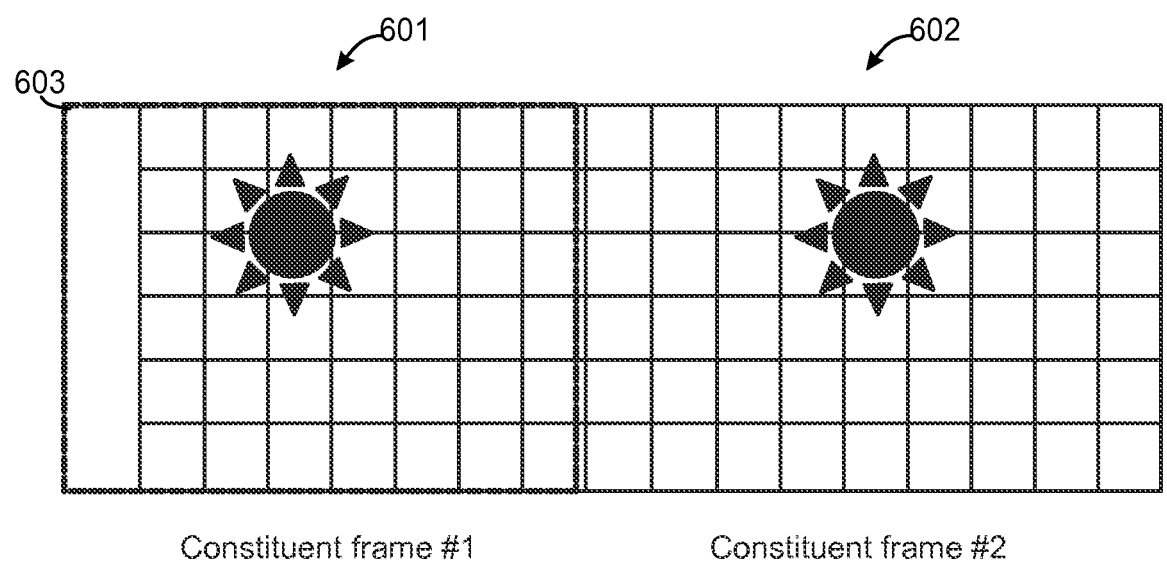
Constituent frame #1    Constituent frame #2
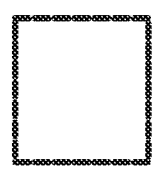 Reference region for motion vector prediction
Fig. 6a

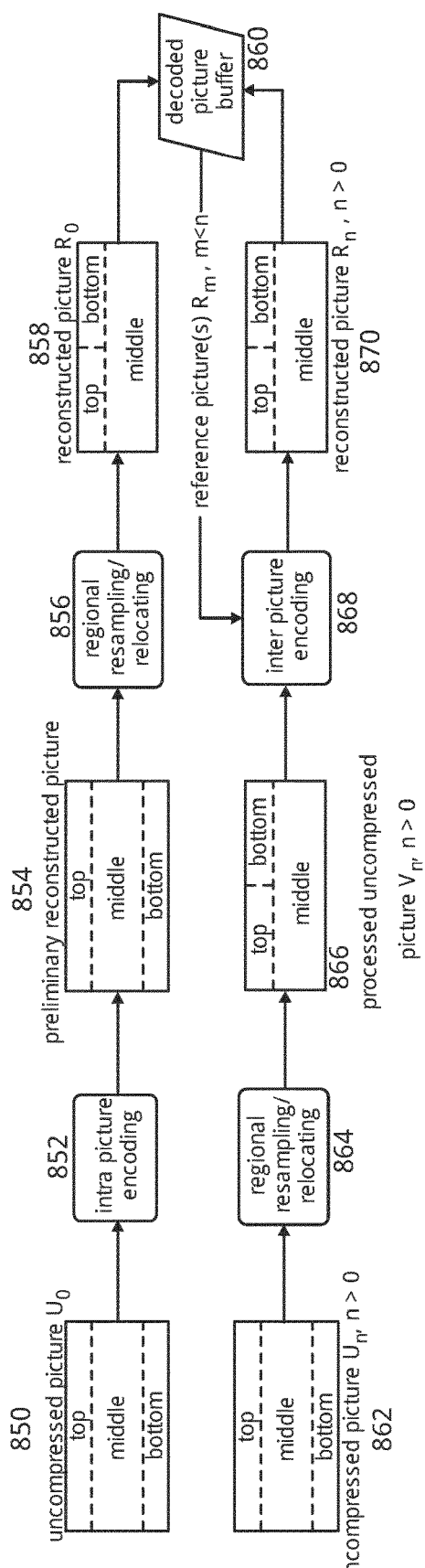
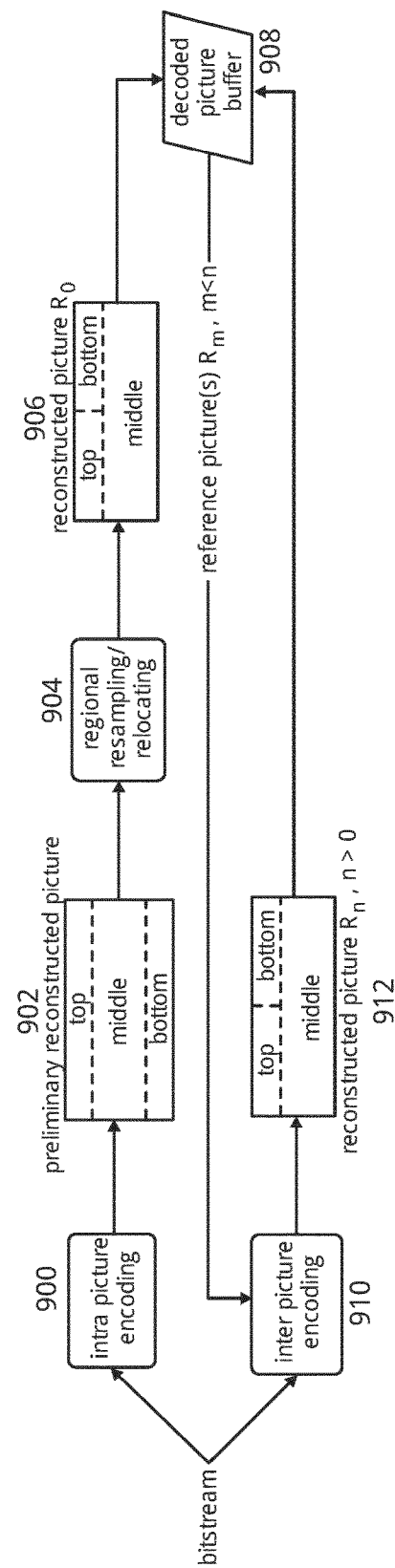
Fig. 8
Fig. 9

APPARATUS, A METHOD AND A COMPUTER PROGRAM FOR VIDEO CODING AND DECODING

RELATED APPLICATION

This application was originally filed as Patent Cooperation Treaty Application No. PCT/FI2017/050448 filed Jun. 15, 2017 which claims priority benefit to FI Patent Application No. 20165547, filed Jun. 30, 2016.

TECHNICAL FIELD

The present invention relates to an apparatus, a method and a computer program for video coding and decoding.

BACKGROUND

A video coding system may comprise an encoder that transforms an input video into a compressed representation suited for storage/transmission and a decoder that can uncompress the compressed video representation back into a viewable form. The encoder may discard some information in the original video sequence in order to represent the video in a more compact form, for example, to enable the storage/transmission of the video information at a lower bitrate than otherwise might be needed.

360-degree panoramic content cover horizontally the full 360-degree field-of-view around the capturing position of an imaging device. A specific projection for mapping a panoramic image covering 360-degree field-of-view horizontally and 180-degree field-of-view vertically to a rectangular two-dimensional image plane is known as equirectangular projection. In this case, the horizontal coordinate may be considered equivalent to a longitude, and the vertical coordinate may be considered equivalent to a latitude, with no transformation or scaling applied.

The equirectangular panorama format stretches the nadir and the zenith areas. The number of pixels towards the nadir or zenith is proportionally greater compared to that in the equator. This results into unnecessarily large number of pixels being encoded and decoded in the areas close to the nadir and zenith, which in turn increases encoding and decoding complexity and may result into a decreased rate-distortion performance.

SUMMARY

Some embodiments provide a method for encoding and decoding video information. In some embodiments of the present invention there is provided a method, apparatus and computer program product for video coding.

A method according to a first aspect comprises decoding, from a bitstream, a first encoded region of first picture into a first preliminary reconstructed region; forming a first reconstructed region from the first preliminary reconstructed region, wherein the forming comprises resampling and/or rearranging the first preliminary reconstructed region, wherein the rearranging comprises relocating, rotating and/or mirroring; and decoding at least a second region, wherein the first reconstructed region is used as a reference for prediction in decoding the at least second region and the second region either belongs to a second picture and is spatially collocated with the first reconstructed region or belongs to the first picture.

According to an embodiment, said forming of the first reconstructed region is performed on block basis or block row basis.

According to an embodiment, the method further comprises determining a sampling ratio for a region; determining at least one reference picture based on said sampling ratio; performing sample decoding operations using said at least one reference picture; storing the result of said sample decoding operations in at least a first and a second reference picture buffer, where storing samples to first reference picture buffer only involves resampling operations.

According to an embodiment, the method further comprises decoding, from the bitstream, a first encoded picture into a preliminary reconstructed picture comprising a plurality of regions, each region covering a subset of the preliminary reconstructed picture; forming a first reconstructed picture from the preliminary reconstructed picture, wherein the forming comprises resampling and rearranging at least a first region of the preliminary reconstructed picture; decoding a second encoded picture, wherein the decoding comprises prediction from the first reconstructed picture.

According to an embodiment, the method further comprises obtaining the preliminary reconstructed picture by decoding the first encoded picture in accordance with an intra picture decoding method.

According to an embodiment, said at least first region and/or said at least second region comprises at least one of the following:
 a top region of a vertical field of view of the preliminary reconstructed picture;
 a bottom region of a vertical field of view of the preliminary reconstructed picture.

According to an embodiment, the preliminary reconstructed picture comprises at least one top region of the vertical field of view, a middle region of the vertical field of view, and at least one bottom region of the vertical field of view.

According to an embodiment, the preliminary reconstructed picture comprises the at least one top region of the vertical field of view and the at least one bottom region of the vertical field of view as regionally downsampled and packed into a frame with the middle region of the vertical field of view.

According to an embodiment, the method further comprises decoding an indication from the bitstream, such as from a picture parameter set or a sequence parameter set, about one or more of the following:
 location and size of regions within the preliminary reconstructed picture;
 rearranging instructions, including at least one resampling ratio for selected regions and locations of regions;
 location and size of regions within the reconstructed picture; and
determining, from the decoded indication, parameters for a regional downsampling and/or rearranging process to be applied.

According to an embodiment, the method further comprises decoding a region from one or more complete slices, not containing coded data from other regions.

According to an embodiment, the method further comprises decoding a region from a tile or a tile set, not containing coded data from other regions.

According to an embodiment, the method further comprises decoding an indication from the bitstream, such as from a slice header or per tile or tile set basis, about one or more of the following:

at least one resampling ratio for the slice, tile, or tile set to be applied in the resampling process, or size of the slice, tile, or tile set within the reconstructed picture;

location for the slice, tile, or tile set within the reconstructed picture; and determining, from the decoded indication, parameters for a regional downsampling and/or rearranging process to be applied.

A second aspect relates to an apparatus comprising at least one processor and at least one memory, said at least one memory stored with code thereon, which when executed by said at least one processor, causes the apparatus to perform at least:

decoding, from a bitstream, a first encoded region of first picture into a first preliminary reconstructed region; forming a first reconstructed region from the first preliminary reconstructed region, wherein the forming comprises resampling and/or rearranging the first preliminary reconstructed region, wherein the rearranging comprises relocating, rotating and/or mirroring; and decoding at least a second region, wherein the first reconstructed region is used as a reference for prediction in decoding the at least second region and the second region either belongs to a second picture and is spatially collocated with the first reconstructed region or belongs to the first picture.

A third aspect relates to a method comprising: encoding a first region of a first picture comprising a plurality of regions, wherein the encoding comprises reconstructing a first preliminary reconstructed region corresponding to said first region; forming a first reconstructed region from the preliminary reconstructed region, wherein the forming comprises resampling and/or rearranging the first preliminary reconstructed region, wherein the rearranging comprises relocating, rotating and/or mirroring; and encoding at least a second region belonging to the first picture or to a second picture, wherein the first reconstructed region is used as a reference for prediction in encoding the at least second region.

According to an embodiment, said forming of the first reconstructed region is performed on block basis or block row basis.

According to an embodiment, the method further comprises determining a sampling ratio for a region; decoding a set of initial samples based on said sampling ratio; resampling the initial samples to a resolution of an output image; and storing the resampled samples in a decoded picture buffer.

According to an embodiment, the method further comprises encoding a first picture, wherein the encoding comprises reconstructing a preliminary reconstructed picture comprising a plurality of regions, each region covering a subset of the preliminary reconstructed picture; forming a first reconstructed picture from the preliminary reconstructed picture, wherein the forming comprises resampling and rearranging at least a first region of the preliminary reconstructed picture; forming a processed second picture from a second picture comprising a plurality of regions, each region covering a subset of the preliminary reconstructed picture, wherein the forming comprises resampling and rearranging at least a second region of the second picture, wherein the at least second region is spatially collocated with the at least first region and said resampling and rearranging is performed similarly as for the preliminary reconstructed picture; encoding the processed second picture, wherein the encoding comprises prediction from the first reconstructed picture.

According to an embodiment, the method further comprises obtaining the preliminary reconstructed picture by encoding the first picture in accordance with an intra picture encoding method.

According to an embodiment, the second picture is a non-consecutive picture of the first picture.

According to an embodiment, said at least first region and/or said at least second region comprises at least one of the following:

a top region of a vertical field of view of the preliminary reconstructed picture;

a bottom region of a vertical field of view of the preliminary reconstructed picture.

According to an embodiment, the preliminary reconstructed picture comprises at least one top region of the vertical field of view, a middle region of the vertical field of view, and at least one bottom region of the vertical field of view.

According to an embodiment, the method further comprises regionally downsampling the at least one top region of the vertical field of view and the at least one bottom region of the vertical field of view; and packing the downsampled top and bottom regions into a frame with the middle region of the vertical field of view.

According to an embodiment, the method further comprises indicating in the bitstream, such as in a picture parameter set or a sequence parameter set, one or more of the following:

location and size of regions within the preliminary reconstructed picture;

rearranging instructions, including at least one resampling ratio for selected regions and locations of regions;

location and size of regions within the reconstructed picture.

According to an embodiment, the method further comprises encoding a region as one or more complete slices, not containing coded data from other regions.

According to an embodiment, the method further comprises encoding a region as a tile or a tile set, not containing coded data from other regions.

According to an embodiment, the method further comprises indicating in the bitstream, such as in a slice header or per tile or tile set basis, one or more of the following:

at least one resampling ratio for the slice, tile, or tile set to be applied in the resampling process, or size of the slice, tile, or tile set within the reconstructed picture;

location for the slice, tile, or tile set within the reconstructed picture.

A fourth aspect relates to an apparatus comprising at least one processor and at least one memory, said at least one memory stored with code thereon, which when executed by said at least one processor, causes the apparatus to perform at least: encoding a first region of a first picture comprising a plurality of regions, wherein the encoding comprises reconstructing a first preliminary reconstructed region corresponding to said first region; forming a first reconstructed region from the preliminary reconstructed region, wherein the forming comprises resampling and/or rearranging the first preliminary reconstructed region, wherein the rearranging comprises relocating, rotating and/or mirroring; and encoding at least a second region belonging to the first picture or to a second picture, wherein the first reconstructed region is used as a reference for prediction in encoding the at least second region.

BRIEF DESCRIPTION OF THE DRAWINGS

For better understanding of the present invention, reference will now be made by way of example to the accompanying drawings in which:

FIG. 5a shows spatial candidate sources of the candidate motion vector predictor, in accordance with an embodiment;

FIG. 5b shows temporal candidate sources of the candidate motion vector predictor, in accordance with an embodiment;

FIG. 6a illustrates an example, where a motion field of a first constituent frame of a picture is used as a reference for motion vector prediction for a second constituent frame of the picture, in accordance with an embodiment;

FIG. 8 illustrates an encoding method involving regional resampling in accordance with an embodiment;

FIG. 9 illustrates a decoding method involving regional resampling in accordance with an embodiment;

DETAILED DESCRIPTION OF SOME EXAMPLE EMBODIMENTS

In the following, several embodiments of the invention will be described in the context of one video coding arrangement. It is to be noted, however, that the invention is not limited to this particular arrangement. In fact, the different embodiments have applications widely in any environment where improvement of non-scalable, scalable and/or multi-view video coding is required. For example, the invention may be applicable to video coding systems like streaming systems, DVD players, digital television receivers, personal video recorders, systems and computer programs on personal computers, handheld computers and communication devices, as well as network elements such as transcoders and cloud computing arrangements where video data is handled.

Figure 1:
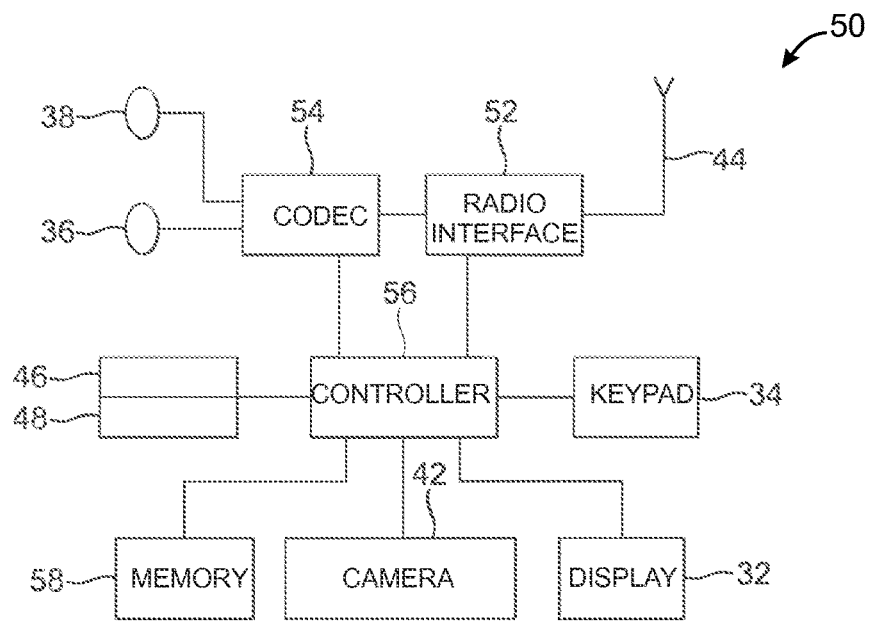
FIG. 1 shows schematically an electronic device employing embodiments of the invention.
Figure 2:
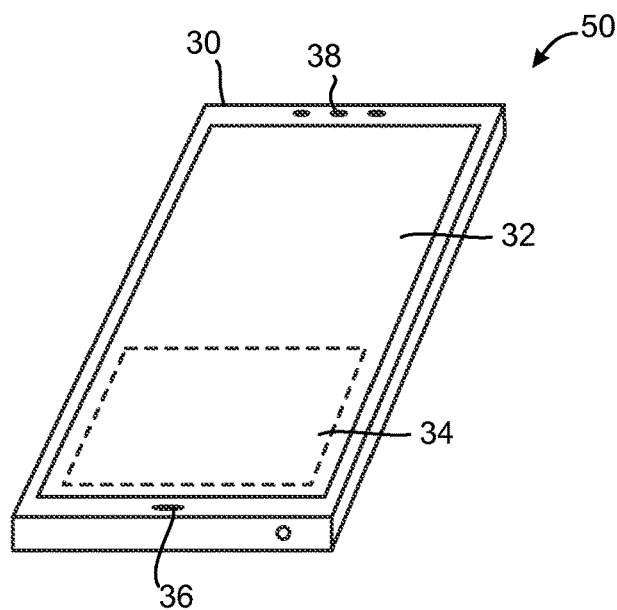
FIG. 2 shows schematically a user equipment suitable for employing embodiments of the invention.

The following describes in further detail suitable apparatus and possible mechanisms for implementing some embodiments. In this regard reference is first made to FIGS. 1 and 2, where FIG. 1 shows a block diagram of a video coding system according to an example embodiment as a schematic block diagram of an exemplary apparatus or electronic device 50, which may incorporate a codec according to an embodiment of the invention. FIG. 2 shows a layout of an apparatus according to an example embodiment. The elements of FIGS. 1 and 2 will be explained next.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise a camera 42 capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

The apparatus 50 may comprise a camera capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding.

Figure 3:
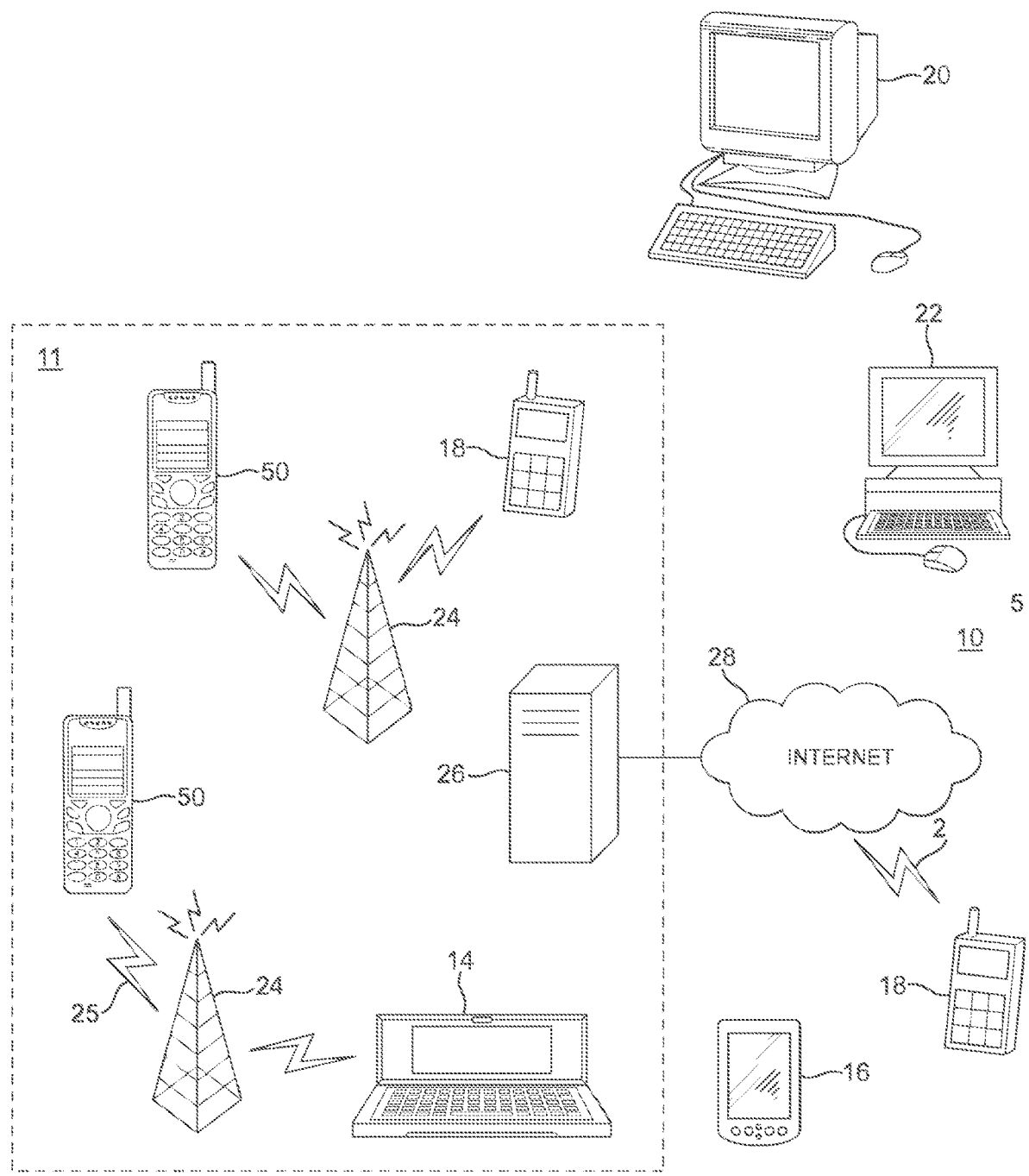
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices and/or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver, which may/may not have a display or wireless capabilities, in tablets or (laptop) personal computers (PC), which have hardware or software or combination of the encoder/decoder implementations, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

Real-time Transport Protocol (RTP) is widely used for real-time transport of timed media such as audio and video. RTP may operate on top of the User Datagram Protocol (UDP), which in turn may operate on top of the Internet Protocol (IP). RTP is specified in Internet Engineering Task Force (IETF) Request for Comments (RFC) 3550, available from www.ietforg/rfc/rfc3550.txt. In RTP transport, media data is encapsulated into RTP packets. Typically, each media type or media coding format has a dedicated RTP payload format.

An RTP session is an association among a group of participants communicating with RTP. It is a group communications channel which can potentially carry a number of RTP streams. An RTP stream is a stream of RTP packets comprising media data. An RTP stream is identified by an SSRC belonging to a particular RTP session. SSRC refers to either a synchronization source or a synchronization source identifier that is the 32-bit SSRC field in the RTP packet header. A synchronization source is characterized in that all packets from the synchronization source form part of the same timing and sequence number space, so a receiver may group packets by synchronization source for playback. Examples of synchronization sources include the sender of a stream of packets derived from a signal source such as a microphone or a camera, or an RTP mixer. Each RTP stream is identified by a SSRC that is unique within the RTP session.

Video codec consists of an encoder that transforms the input video into a compressed representation suited for storage/transmission and a decoder that can uncompress the compressed video representation back into a viewable form. A video encoder and/or a video decoder may also be separate from each other, i.e. need not form a codec. Typically encoder discards some information in the original video sequence in order to represent the video in a more compact form (that is, at lower bitrate). A video encoder may be used to encode an image sequence, as defined subsequently, and a video decoder may be used to decode a coded image sequence. A video encoder or an intra coding part of a video encoder or an image encoder may be used to encode an image, and a video decoder or an inter decoding part of a video decoder or an image decoder may be used to decode a coded image.

Some hybrid video encoders, for example many encoder implementations of ITU-T H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate). Many coding schemes enable an encoder to indicate a quantization parameter (QP) in the bitstream, and respectively a decoder can decode quantization parameter (QP) from the bitstream. QP may indicate the quantization step size or the quantization points used in the coefficient quantization. QP may be indicated for various scopes, such as sequence, picture, or block.

In temporal prediction, the sources of prediction are previously decoded pictures (a.k.a. reference pictures). In intra block copy (a.k.a. intra-block-copy prediction), prediction is applied similarly to temporal prediction but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction. Inter coding may refer to coding modes where inter prediction is applied.

Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

There may be different types of intra prediction modes available in a coding scheme, out of which an encoder can select and indicate the used one, e.g. on block or coding unit basis. A decoder may decode the indicated intra prediction mode and reconstruct the prediction block accordingly. For example, several angular intra prediction modes, each for different angular direction, may be available. Angular intra prediction may be considered to extrapolate the border samples of adjacent blocks along a linear prediction direction. Additionally or alternatively, a planar prediction mode may be available. Planar prediction may be considered to essentially form a prediction block, in which each sample of a prediction block may be specified to be an average of a vertically aligned sample in the adjacent sample column on the left of the current block and the horizontally aligned sample in the adjacent sample line above the current block. Additionally or alternatively, a DC prediction mode may be available, in which the prediction block is essentially an average sample value of a neighboring block or blocks.

One outcome of the coding procedure is a set of coding parameters, such as motion vectors and quantized transform coefficients. Many parameters can be entropy-coded more efficiently if they are predicted first from spatially or temporally neighbouring parameters. For example, a motion vector may be predicted from spatially adjacent motion vectors and only the difference relative to the motion vector predictor may be coded. Prediction of coding parameters and intra prediction may be collectively referred to as in-picture prediction.

A motion vector may be considered to represent the displacement of an image block in the picture to be coded (in the encoder side) or decoded (in the decoder side) and the prediction source block in one of the previously coded or decoded pictures. In order to represent motion vectors efficiently those are typically coded differentially with respect to block specific predicted motion vectors. In typical video codecs the predicted motion vectors are created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signaling the chosen candidate as the motion vector predictor. In addition to predicting the motion vector values, the reference index of previously coded/decoded picture can be predicted. The reference index is typically predicted from adjacent blocks and/or or co-located blocks in temporal reference picture. Motion vectors may have sub-pixel accuracy (e.g. quarter-pixel accuracy), and sample values in fractional-pixel positions may be obtained using interpolation filtering e.g. with a finite impulse response (FIR) filter.

Figure 4:
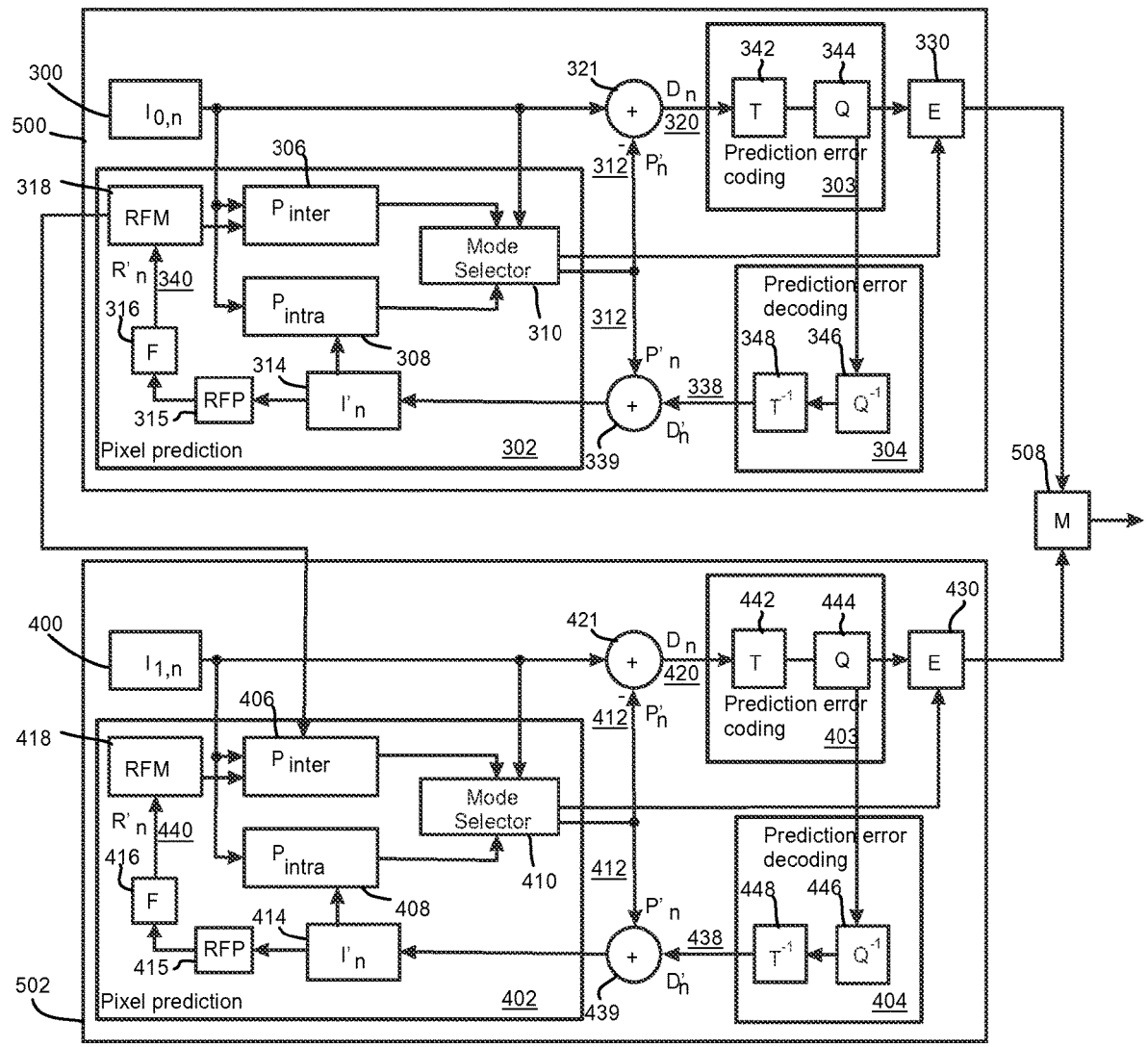
FIG. 4 shows schematically an encoder suitable for implementing embodiments of the invention.

FIG. 4 shows a block diagram of a video encoder suitable for employing embodiments of the invention. FIG. 4 presents an encoder for two layers, but it would be appreciated that presented encoder could be similarly simplified to encode only one layer or extended to encode more than two layers. FIG. 4 illustrates an embodiment of a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives 300 base layer images of a video stream to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. An intra picture encoding method is such that the inter-predictor 306 or its output is omitted and only intra prediction is in use. An inter picture encoding method is such that the inter-predictor 306 is in use and its output is considered in the mode selection 310 and hence inter prediction may be chosen by the encoder. Correspondingly, the pixel predictor 402 of the second encoder section 502 receives 400 enhancement layer images of a video stream to be encoded at both the inter-predictor 406 (which determines the difference between the image and a motion compensated reference frame 418) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a regional reference frame processing unit 315, 415. The regional reference frame processing unit 315, 415 may regionally resample and/or rearrange the preliminary reconstructed image according to one or more different embodiments described further below to produce a regionally processed reference image. The regionally processed reference image may be passed to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer picture 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer pictures 400 is compared in inter-prediction operations. Moreover, the reference frame memory 418 may be connected to the inter-predictor 406 to be used as the reference image against which a future enhancement layer picture 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

It needs to be understood that the regional reference frame processing unit 315, 415 and the filter 316, 416 may, in some embodiments, be located in opposite order in FIG. 4. It also needs to be understood that in some embodiments parts of the filtering performed by the filter 316, 416 may be performed prior to regional reference frame processing 315, 415, while the remaining parts may be performed after the regional reference frame processing 315, 415. Likewise, some parts of the regional reference frame processing 315, 415 (e.g. resampling) may be performed prior to the filter 316, 416, while the remaining parts of the reference frame processing 315, 415 (e.g. rearranging) may be performed after the filter 316, 416.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, e.g. the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 361, 461, which dequantizes the quantized coefficient values, e.g. DCT coefficients, to reconstruct the transform signal and an inverse transformation unit 363, 463, which performs the inverse transformation to the reconstructed transform signal wherein the output of the inverse transformation unit 363, 463 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, integrating new extensions or features to the specification. These extensions include Scalable Video Coding (SVC) and Multiview Video Coding (MVC).

Version 1 of the High Efficiency Video Coding (H.265/HEVC a.k.a. HEVC) standard was developed by the Joint Collaborative Team-Video Coding (JCT-VC) of VCEG and MPEG. The standard was published by both parent standardization organizations, and it is referred to as ITU-T Recommendation H.265 and ISO/IEC International Standard 23008-2, also known as MPEG-H Part 2 High Efficiency Video Coding (HEVC). Subsequent versions of H.265/HEVC have included scalable, multiview, fidelity range, three-dimensional, and screen content coding extensions, which may be abbreviated SHVC, MV-HEVC, REXT, 3D-HEVC, and SCC respectively.

SHVC, MV-HEVC, and 3D-HEVC use a common basis specification, specified in Annex F of the version 2 of the HEVC standard. This common basis comprises for example high-level syntax and semantics e.g. specifying some of the characteristics of the layers of the bitstream, such as inter-layer dependencies, as well as decoding processes, such as reference picture list construction including inter-layer reference pictures and picture order count derivation for multi-layer bitstream. Annex F may also be used in potential subsequent multi-layer extensions of HEVC. It is to be understood that even though a video encoder, a video decoder, encoding methods, decoding methods, bitstream structures, and/or embodiments may be described in the following with reference to specific extensions, such as SHVC and/or MV-HEVC, they are generally applicable to any multi-layer extensions of HEVC, and even more generally to any multi-layer video coding scheme.

Some key definitions, bitstream and coding structures, and concepts of H.264/AVC and HEVC are described in this section as an example of a video encoder, decoder, encoding method, decoding method, and a bitstream structure, wherein the embodiments may be implemented. Some of the key definitions, bitstream and coding structures, and concepts of H.264/AVC are the same as in HEVC—hence, they are described below jointly. The aspects of the invention are not limited to H.264/AVC or HEVC, but rather the description is given for one possible basis on top of which the invention may be partly or fully realized.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

In the description of existing standards as well as in the description of example embodiments, a syntax element may be defined as an element of data represented in the bitstream. A syntax structure may be defined as zero or more syntax elements present together in the bitstream in a specified order. In the description of existing standards as well as in the description of example embodiments, a phrase "by external means" or "through external means" may be used. For example, an entity, such as a syntax structure or a value of a variable used in the decoding process, may be provided "by external means" to the decoding process. The phrase "by external means" may indicate that the entity is not included in the bitstream created by the encoder, but rather conveyed externally from the bitstream for example using a control protocol. It may alternatively or additionally mean that the entity is not created by the encoder, but may be created for example in the player or decoding control logic or alike that is using the decoder. The decoder may have an interface for inputting the external means, such as variable values.

The elementary unit for the input to an H.264/AVC or HEVC encoder and the output of an H.264/AVC or HEVC decoder, respectively, is a picture. A picture given as an input to an encoder may also referred to as a source picture, and a picture decoded by a decoded may be referred to as a decoded picture.

The source and decoded pictures are each comprised of one or more sample arrays, such as one of the following sets of sample arrays:
  Luma (Y) only (monochrome).
  Luma and two chroma (YCbCr or YCgCo).
  Green, Blue and Red (GBR, also known as RGB).
  Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr, regardless of the actual color representation method in use. The actual color representation method in use can be indicated e.g. in a coded bitstream e.g. using the Video Usability Information (VUI) syntax of H.264/AVC and/or HEVC. A component may be defined as an array or single sample from one of the three sample arrays (luma and two chroma) or the array or a single sample of the array that compose a picture in monochrome format.

In H.264/AVC and HEVC, a picture may either be a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays. Chroma formats may be summarized as follows:
  In monochrome sampling there is only one sample array, which may be nominally considered the luma array.
  In 4:2:0 sampling, each of the two chroma arrays has half the height and half the width of the luma array.
  In 4:2:2 sampling, each of the two chroma arrays has the same height and half the width of the luma array.
  In 4:4:4 sampling when no separate color planes are in use, each of the two chroma arrays has the same height and width as the luma array.

In H.264/AVC and HEVC, it is possible to code sample arrays as separate color planes into the bitstream and respectively decode separately coded color planes from the bitstream. When separate color planes are in use, each one of them is separately processed (by the encoder and/or the decoder) as a picture with monochrome sampling.

A partitioning may be defined as a division of a set into subsets such that each element of the set is in exactly one of the subsets.

In H.264/AVC, a macroblock is a 16×16 block of luma samples and the corresponding blocks of chroma samples. For example, in the 4:2:0 sampling pattern, a macroblock contains one 8×8 block of chroma samples per each chroma component. In H.264/AVC, a picture is partitioned to one or more slice groups, and a slice group contains one or more slices. In H.264/AVC, a slice consists of an integer number of macroblocks ordered consecutively in the raster scan within a particular slice group.

When describing the operation of HEVC encoding and/or decoding, the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples.

In some video codecs, such as High Efficiency Video Coding (HEVC) codec, video pictures are divided into coding units (CU) covering the area of the picture. A CU consists of one or more prediction units (PU) defining the prediction process for the samples within the CU and one or more transform units (TU) defining the prediction error coding process for the samples in the said CU. Typically, a CU consists of a square block of samples with a size selectable from a predefined set of possible CU sizes. A CU with the maximum allowed size may be named as LCU (largest coding unit) or coding tree unit (CTU) and the video picture is divided into non-overlapping LCUs. An LCU can be further split into a combination of smaller CUs, e.g. by recursively splitting the LCU and resultant CUs. Each resulting CU typically has at least one PU and at least one TU associated with it. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs).

Each TU can be associated with information describing the prediction error decoding process for the samples within the said TU (including e.g. DCT coefficient information). It may be signalled at CU level whether prediction error coding is applied or not for each CU. In the case there is no prediction error residual associated with the CU, it can be considered there are no TUs for the said CU. The division of the image into CUs, and division of CUs into PUs and TUs may be signalled in the bitstream allowing the decoder to reproduce the intended structure of these units.

In HEVC, a picture can be partitioned in tiles, which are rectangular and contain an integer number of LCUs. In HEVC, the partitioning to tiles forms a grid comprising one or more tile columns and one or more tile rows. A coded tile is byte-aligned, which may be achieved by adding byte-alignment bits at the end of the coded tile.

In HEVC, the partitioning to tiles may be constrained to form a regular grid, where heights and widths of tiles differ from each other by one LCU at the maximum. In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

In HEVC, a tile contains an integer number of coding tree units, and may consist of coding tree units contained in more than one slice. Similarly, a slice may consist of coding tree units contained in more than one tile. In HEVC, all coding tree units in a slice belong to the same tile and/or all coding tree units in a tile belong to the same slice. Furthermore, in HEVC, all coding tree units in a slice segment belong to the same tile and/or all coding tree units in a tile belong to the same slice segment.

A motion-constrained tile set is such that the inter prediction process is constrained in encoding such that no sample value outside the motion-constrained tile set, and no sample value at a fractional sample position that is derived using one or more sample values outside the motion-constrained tile set, is used for inter prediction of any sample within the motion-constrained tile set.

It is noted that sample locations used in inter prediction are saturated so that a location that would be outside the picture otherwise is saturated to point to the corresponding boundary sample of the picture. Hence, if a tile boundary is also a picture boundary, motion vectors may effectively cross that boundary or a motion vector may effectively cause fractional sample interpolation that would refer to a location outside that boundary, since the sample locations are saturated onto the boundary.

The temporal motion-constrained tile sets SEI message of HEVC can be used to indicate the presence of motion-constrained tile sets in the bitstream.

An inter-layer constrained tile set is such that the inter-layer prediction process is constrained in encoding such that no sample value outside each associated reference tile set, and no sample value at a fractional sample position that is derived using one or more sample values outside each associated reference tile set, is used for inter-layer prediction of any sample within the inter-layer constrained tile set.

The inter-layer constrained tile sets SEI message of HEVC can be used to indicate the presence of inter-layer constrained tile sets in the bitstream.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

The filtering may for example include one more of the following: deblocking, sample adaptive offset (SAO), and/or adaptive loop filtering (ALF). H.264/AVC includes a deblocking, whereas HEVC includes both deblocking and SAO. Deblocking may be used to smooth out discontinuities at block boundaries and it may be comprise an averaging filtering with adaptive filter tap weights, e.g. based on quantization parameter and/or coding mode, such as intra or inter mode.

The SAO used in HEVC is described here as an example, while it needs to be algorithm that SAO could be implemented with other coding standards or systems similarly, either entirely (using both band offset and edge offset modes) or in parts (using either mode). In the SAO algorithm, samples in a CTU are classified according to a set of rules and each classified set of samples are enhanced by adding offset values. The offset values are signalled in the bitstream. There are two types of offsets: 1) Band offset 2) Edge offset. For a CTU, either no SAO or band offset or edge offset is employed. Choice of whether no SAO or band or edge offset to be used may be decided by the encoder with e.g. rate distortion optimization (RDO) and signaled to the decoder. In the band offset, the whole range of sample values is divided into a certain number of bands, e.g. 32 equal-width bands. For example, for 8-bit samples, width of a band is 8 (=256/32). Out of the total number of bands, a certain number of bands, e.g. four, are selected and different offsets are signalled for each of the selected bands. The selection decision is made by the encoder and may be signalled as follows: The index of the first band is signalled and then it is inferred that the following four bands are the chosen ones. The band offset may be useful in correcting errors in smooth regions. In the edge offset type, the edge offset (EO) type may be chosen out of four possible types (or edge classifications) where each type is associated with a direction: 1) vertical, 2) horizontal, 3) 135 degrees diagonal, and 4) 45 degrees diagonal. The choice of the direction is given by the encoder and signalled to the decoder. Each type defines the location of two neighbour samples for a given sample based on the angle. Then each sample in the CTU is classified into one of five categories based on comparison of the sample value against the values of the two neighbour samples. The five categories are described as follows: i) Current sample value is smaller than the two neighbour samples. ii) Current sample value is smaller than one of the neighbors and equal to the other neighbor. iii) Current sample value is greater than one of the neighbors and equal to the other neighbor. iv) Current sample value is greater than two neighbor samples. v) None of the previous. These five categories are not required to be signalled to the decoder because the classification is based on only reconstructed samples, which may be available and identical in both the encoder and decoder. After each sample in an edge offset type CTU is classified as one of the five categories, an offset value for each of the first four categories is determined and signalled to the decoder. The offset for each category is added to the sample values associated with the corresponding category. Edge offsets may be effective in correcting ringing artifacts. The SAO parameters may be signalled as interleaved in CTU data.

The adaptive loop filter (ALF) is another method to enhance quality of the reconstructed samples. This may be achieved by filtering the sample values in the loop. The encoder may determine which region(s) of the pictures are to be filtered and the filter coefficients based on e.g. RDO and this information is signalled to the decoder.

In typical video codecs the motion information is indicated with motion vectors associated with each motion compensated image block, such as a prediction unit. Each of these motion vectors represents the displacement of the image block in the picture to be coded (in the encoder side) or decoded (in the decoder side) and the prediction source block in one of the previously coded or decoded pictures. In order to represent motion vectors efficiently those are typically coded differentially with respect to block specific predicted motion vectors. In typical video codecs the predicted motion vectors are created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, it can be predicted which reference picture(s) are used for motion-compensated prediction and this prediction information may be represented for example by a reference index of previously coded/decoded picture. The reference index is typically predicted from adjacent blocks and/or co-located blocks in temporal reference picture. Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signalled among a list of motion field candidate list filled with motion field information of available adjacent/co-located blocks.

Typical video codecs enable the use of uni-prediction, where a single prediction block is used for a block being (de)coded, and bi-prediction, where two prediction blocks are combined to form the prediction for a block being (de)coded. Some video codecs enable weighted prediction, where the sample values of the prediction blocks are weighted prior to adding residual information. For example, multiplicative weighting factor and an additive offset which can be applied. In explicit weighted prediction, enabled by some video codecs, a weighting factor and offset may be coded for example in the slice header for each allowable reference picture index. In implicit weighted prediction, enabled by some video codecs, the weighting factors and/or offsets are not coded but are derived e.g. based on the relative picture order count (POC) distances of the reference pictures.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

Typical video encoders utilize Lagrangian cost functions to find optimal coding modes, e.g. the desired Macroblock mode and associated motion vectors. This kind of cost function uses a weighting factor $\lambda$ to tie together the (exact or estimated) image distortion due to lossy coding methods and the (exact or estimated) amount of information that is required to represent the pixel values in an image area:

$$C=D+\lambda R \qquad (1)$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Video coding standards and specifications may allow encoders to divide a coded picture to coded slices or alike. In-picture prediction is typically disabled across slice boundaries. Thus, slices can be regarded as a way to split a coded picture to independently decodable pieces. In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighbouring macroblock or CU may be regarded as unavailable for intra prediction, if the neighbouring macroblock or CU resides in a different slice.

An elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. A NAL unit may be defined as a syntax structure containing an indication of the type of data to follow and bytes containing that data in the form of an RBSP interspersed as necessary with startcode emulation prevention bytes. A raw byte sequence payload one or more coded macroblocks, each of which corresponds to a block of samples in the uncompressed picture. In HEVC, VCLNAL units contain syntax elements representing one or more CU.

In HEVC, a coded slice NAL unit can be indicated to be one of the following types:

| nal_unit_type | Name of nal_unit_type | Content of NAL unit and RBSP syntax structure |
|---|---|---|
| 0, 1 | TRAIL_N, TRAIL_R | Coded slice segment of a non-TSA, non-STSA trailing picture slice_segment_layer_rbsp( ) |
| 2, 3 | TSA_N, TSA_R | Coded slice segment of a TSA picture slice_segment_layer_rbsp( ) |
| 4, 5 | STSA_N, STSA_R | Coded slice segment of an STSA picture slice_layer_rbsp( ) |
| 6, 7 | RADL_N, RADL_R | Coded slice segment of a RADL picture slice_layer_rbsp( ) |
| 8, 9 | RASL_N, RASL_R, | Coded slice segment of a RASL picture slice_layer_rbsp( ) |
| 10, 12, 14 | RSV_VCL_N10 RSV_VCL_N12 RSV_VCL_N14 | Reserved // reserved non-RAP non-reference VCL NAL unit types |
| 11, 13, 15 | RSV_VCL_R11 RSV_VCL_R13 RSV_VCL_R15 | Reserved // reserved non-RAP reference VCL NAL unit types |
| 16, 17, 18 | BLA_W_LP IDR_W_RADL BLA_N_LP | Coded slice segment of a BLA picture slice_segment_layer_rbsp( ) |
| 19, 20 | IDR_W_RADL IDR_N_LP | Coded slice segment of an IDR picture slice_segment_layer_rbsp( ) |
| 21 | CRA_NUT | Coded slice segment of a CRA picture slice_segment_layer_rbsp( ) |
| 22, 23 | RSV_IRAP_VCL22 . . . RSV_IRAP_VCL23 | Reserved // reserved RAP VCL NAL unit types |
| 24 . . . 31 | RSV_VCL24 . . . RSV_VCL31 | Reserved // reserved non-RAP VCL NAL unit types |

(RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0. NAL units consist of a header and payload.

In HEVC, a two-byte NAL unit header is used for all specified NAL unit types. The NAL unit header contains one reserved bit, a six-bit NAL unit type indication, a three-bit nuh_temporal_id_plus1 indication for temporal level (may be required to be greater than or equal to 1) and a six-bit nuh_layer_id syntax element. The temporal_id_plus1 syntax element may be regarded as a temporal identifier for the NAL unit, and a zero-based TemporalId variable may be derived as follows: TemporalId=temporal_id_plus1−1. TemporalId equal to 0 corresponds to the lowest temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to TID does not use any picture having a TemporalId greater than TID as inter prediction reference. A sub-layer or a temporal sub-layer may be defined to be a temporal scalable layer of a temporal scalable bitstream, consisting of VCL NAL units with a particular value of the TemporalId variable and the associated non-VCL NAL units. nuh_layer_id can be understood as a scalability layer identifier.

NAL units can be categorized into Video Coding Layer (VCL) NAL units and non-VCL NAL units. In H.264/AVC, coded slice NAL units contain syntax elements representing In HEVC, abbreviations for picture types may be defined as follows: trailing (TRAIL) picture, Temporal Sub-layer Access (TSA), Step-wise Temporal Sub-layer Access (STSA), Random Access Decodable Leading (RADL) picture, Random Access Skipped Leading (RASL) picture, Broken Link Access (BLA) picture, Instantaneous Decoding Refresh (IDR) picture, Clean Random Access (CRA) picture.

A Random Access Point (RAP) picture, which may also be referred to as an intra random access point (IRAP) picture, is a picture where each slice or slice segment has nal_unit_type in the range of 16 to 23, inclusive. A IRAP picture in an independent layer does not refer to any pictures other than itself for inter prediction in its decoding process. When no intra block copy is in use, an IRAP picture in an independent layer contains only intra-coded slices. An IRAP picture belonging to a predicted layer with nuh_layer_id value currLayerId may contain P, B, and I slices, cannot use inter prediction from other pictures with nuh_layer_id equal to currLayerId, and may use inter-layer prediction from its direct reference layers. In the present version of HEVC, an IRAP picture may be a BLA picture, a CRA picture or an IDR picture. The first picture in a bitstream containing a base layer is an IRAP picture at the base layer. Provided the necessary parameter sets are available when they need to be activated, an IRAP picture at an independent layer and all subsequent non-RASL pictures at the independent layer in decoding order can be correctly decoded without performing the decoding process of any pictures that precede the IRAP picture in decoding order. The IRAP picture belonging to a predicted layer with nuh_layer_id value currLayerId and all subsequent non-RASL pictures with nuh_layer_id equal to currLayerId in decoding order can be correctly decoded without performing the decoding process of any pictures with nuh_layer_id equal to currLayerId that precede the IRAP picture in decoding order, when the necessary parameter sets are available when they need to be activated and when the decoding of each direct reference layer of the layer with nuh_layer_id equal to currLayerId has been initialized (i.e. when LayerInitializedFlag[refLayerId] is equal to 1 for refLayerId equal to all nuh_layer_id values of the direct reference layers of the layer with nuh_layer_id equal to currLayerId). There may be pictures in a bitstream that contain only intra-coded slices that are not IRAP pictures.

In HEVC a CRA picture may be the first picture in the bitstream in decoding order, or may appear later in the bitstream. CRA pictures in HEVC allow so-called leading pictures that follow the CRA picture in decoding order but precede it in output order. Some of the leading pictures, so-called RASL pictures, may use pictures decoded before the CRA picture as a reference. Pictures that follow a CRA picture in both decoding and output order are decodable if random access is performed at the CRA picture, and hence clean random access is achieved similarly to the clean random access functionality of an IDR picture.

A CRA picture may have associated RADL or RASL pictures. When a CRA picture is the first picture in the bitstream in decoding order, the CRA picture is the first picture of a coded video sequence in decoding order, and any associated RASL pictures are not output by the decoder and may not be decodable, as they may contain references to pictures that are not present in the bitstream.

A leading picture is a picture that precedes the associated RAP picture in output order. The associated RAP picture is the previous RAP picture in decoding order (if present). A leading picture is either a RADL picture or a RASL picture.

All RASL pictures are leading pictures of an associated BLA or CRA picture. When the associated RAP picture is a BLA picture or is the first coded picture in the bitstream, the RASL picture is not output and may not be correctly decodable, as the RASL picture may contain references to pictures that are not present in the bitstream. However, a RASL picture can be correctly decoded if the decoding had started from a RAP picture before the associated RAP picture of the RASL picture. RASL pictures are not used as reference pictures for the decoding process of non-RASL pictures. When present, all RASL pictures precede, in decoding order, all trailing pictures of the same associated RAP picture. In some drafts of the HEVC standard, a RASL picture was referred to a Tagged for Discard (TFD) picture.

All RADL pictures are leading pictures. RADL pictures are not used as reference pictures for the decoding process of trailing pictures of the same associated RAP picture. When present, all RADL pictures precede, in decoding order, all trailing pictures of the same associated RAP picture. RADL pictures do not refer to any picture preceding the associated RAP picture in decoding order and can therefore be correctly decoded when the decoding starts from the associated RAP picture.

When a part of a bitstream starting from a CRA picture is included in another bitstream, the RASL pictures associated with the CRA picture might not be correctly decodable, because some of their reference pictures might not be present in the combined bitstream. To make such a splicing operation straightforward, the NAL unit type of the CRA picture can be changed to indicate that it is a BLA picture. The RASL pictures associated with a BLA picture may not be correctly decodable hence are not be output/displayed. Furthermore, the RASL pictures associated with a BLA picture may be omitted from decoding.

A BLA picture may be the first picture in the bitstream in decoding order, or may appear later in the bitstream. Each BLA picture begins a new coded video sequence, and has similar effect on the decoding process as an IDR picture. However, a BLA picture contains syntax elements that specify a non-empty reference picture set. When a BLA picture has nal_unit_type equal to BLA_W_LP, it may have associated RASL pictures, which are not output by the decoder and may not be decodable, as they may contain references to pictures that are not present in the bitstream. When a BLA picture has nal_unit_type equal to BLA_W_LP, it may also have associated RADL pictures, which are specified to be decoded. When a BLA picture has nal_unit_type equal to BLA_W_RADL, it does not have associated RASL pictures but may have associated RADL pictures, which are specified to be decoded. When a BLA picture has nal_unit_type equal to BLA_N_LP, it does not have any associated leading pictures.

An IDR picture having nal_unit_type equal to IDR_N_LP does not have associated leading pictures present in the bitstream. An IDR picture having nal_unit_type equal to IDR_W_LP does not have associated RASL pictures present in the bitstream, but may have associated RADL pictures in the bitstream.

When the value of nal_unit_type is equal to TRAIL_N, TSA_N, STSA_N, RADL_N, RASL_N, RSV_VCL_N10, RSV_VCL_N12, or RSV_VCL_N14, the decoded picture is not used as a reference for any other picture of the same temporal sub-layer. That is, in HEVC, when the value of nal_unit_type is equal to TRAIL_N, TSA_N, STSA_N, RADL_N, RASL_N, RSV_VCL_N10, RSV_VCL_N12, or RSV_VCL_N14, the decoded picture is not included in any of RefPicSetStCurrBefore, RefPicSetStCurrAfter and RefPicSetLtCurr of any picture with the same value of TemporalId. A coded picture with nal_unit_type equal to TRAIL_N, TSA_N, STSA_N, RADL_N, RASL_N, RSV_VCL_N10, RSV_VCL_N12, or RSV_VCL_N14 may be discarded without affecting the decodability of other pictures with the same value of TemporalId.

A trailing picture may be defined as a picture that follows the associated RAP picture in output order. Any picture that is a trailing picture does not have nal_unit_type equal to RADL_N, RADL_R, RASL_N or RASL_R. Any picture that is a leading picture may be constrained to precede, in decoding order, all trailing pictures that are associated with the same RAP picture. No RASL pictures are present in the bitstream that are associated with a BLA picture having nal_unit_type equal to BLA_W_RADL or BLA_N_LP. No RADL pictures are present in the bitstream that are associated with a BLA picture having nal_unit_type equal to BLA_N_LP or that are associated with an IDR picture having nal_unit_type equal to IDR_N_LP. Any RASL picture associated with a CRA or BLA picture may be constrained to precede any RADL picture associated with the CRA or BLA picture in output order. Any RASL picture associated with a CRA picture may be constrained to follow, in output order, any other RAP picture that precedes the CRA picture in decoding order.

In HEVC there are two picture types, the TSA and STSA picture types that can be used to indicate temporal sub-layer switching points. If temporal sub-layers with TemporalId up to N had been decoded until the TSA or STSA picture (exclusive) and the TSA or STSA picture has TemporalId equal to N+1, the TSA or STSA picture enables decoding of all subsequent pictures (in decoding order) having TemporalId equal to N+1. The TSA picture type may impose restrictions on the TSA picture itself and all pictures in the same sub-layer that follow the TSA picture in decoding order. None of these pictures is allowed to use inter prediction from any picture in the same sub-layer that precedes the TSA picture in decoding order. The TSA definition may further impose restrictions on the pictures in higher sub-layers that follow the TSA picture in decoding order. None of these pictures is allowed to refer a picture that precedes the TSA picture in decoding order if that picture belongs to the same or higher sub-layer as the TSA picture. TSA pictures have TemporalId greater than 0. The STSA is similar to the TSA picture but does not impose restrictions on the pictures in higher sub-layers that follow the STSA picture in decoding order and hence enable up-switching only onto the sub-layer where the STSA picture resides.

A non-VCL NAL unit may be for example one of the following types: a sequence parameter set, a picture parameter set, a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally contain video usability information (VUI), which includes parameters that may be important for buffering, picture output timing, rendering, and resource reservation. In HEVC a sequence parameter set RBSP includes parameters that can be referred to by one or more picture parameter set RBSPs or one or more SEI NAL units containing a buffering period SEI message. A picture parameter set contains such parameters that are likely to be unchanged in several coded pictures. A picture parameter set RBSP may include parameters that can be referred to by the coded slice NAL units of one or more coded pictures.

In HEVC, a video parameter set (VPS) may be defined as a syntax structure containing syntax elements that apply to zero or more entire coded video sequences as determined by the content of a syntax element found in the SPS referred to by a syntax element found in the PPS referred to by a syntax element found in each slice segment header. A video parameter set RBSP may include parameters that can be referred to by one or more sequence parameter set RBSPs.

The relationship and hierarchy between video parameter set (VPS), sequence parameter set (SPS), and picture parameter set (PPS) may be described as follows. VPS resides one level above SPS in the parameter set hierarchy and in the context of scalability and/or 3D video. VPS may include parameters that are common for all slices across all (scalability or view) layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence. VPS may be considered to comprise two parts, the base VPS and a VPS extension, where the VPS extension may be optionally present. In HEVC, the base VPS may be considered to comprise the video_parameter_set_rbsp( ) syntax structure without the vps_extension( ) syntax structure. The video_parameter_set_rbsp( ) syntax structure was primarily specified already for HEVC version 1 and includes syntax elements which may be of use for base layer decoding. In HEVC, the VPS extension may be considered to comprise the vps_extension( ) syntax structure. The vps_extension( ) syntax structure was specified primarily for multi-layer extensions and comprises syntax elements which may be of use for decoding of one or more non-base layers, such as syntax elements indicating layer dependency relations.

H.264/AVC and HEVC syntax allows many instances of parameter sets, and each instance is identified with a unique identifier. In order to limit the memory usage needed for parameter sets, the value range for parameter set identifiers has been limited. In H.264/AVC and HEVC, each slice header includes the identifier of the picture parameter set that is active for the decoding of the picture that contains the slice, and each picture parameter set contains the identifier of the active sequence parameter set. Consequently, the transmission of picture and sequence parameter sets does not have to be accurately synchronized with the transmission of slices. Instead, it is sufficient that the active sequence and picture parameter sets are received at any moment before they are referenced, which allows transmission of parameter sets "out-of-band" using a more reliable transmission mechanism compared to the protocols used for the slice data. For example, parameter sets can be included as a parameter in the session description for Real-time Transport Protocol (RTP) sessions. If parameter sets are transmitted in-band, they can be repeated to improve error robustness.

Out-of-band transmission, signalling or storage can additionally or alternatively be used for other purposes than tolerance against transmission errors, such as ease of access or session negotiation. For example, a sample entry of a track in a file conforming to the ISOBMFF may comprise parameter sets, while the coded data in the bitstream is stored elsewhere in the file or in another file. The phrase along the bitstream (e.g. indicating along the bitstream) may be used in claims and described embodiments to refer to out-of-band transmission, signalling, or storage in a manner that the out-of-band data is associated with the bitstream. The phrase decoding along the bitstream or alike may refer to decoding the referred out-of-band data (which may be obtained from out-of-band transmission, signalling, or storage) that is associated with the bitstream.

The width and height of a decoded picture may have certain constraints, e.g. so that the width and height are multiples of a (minimum) coding unit size. For example, HEVC the width and height of a decoded picture are multiples of 8 luma samples. If the encoded picture has extents that do not fulfil such constraints, the (de)coding may still be performed with a picture size complying with the constraints but the output may be performed by cropping the unnecessary sample lines and columns. In HEVC, this cropping can be controlled by the encoder using the so-called conformance cropping window feature. The conformance cropping window is specified (by the encoder) in the SPS and when outputting the pictures the decoder is required to crop the decoded pictures according to the conformance cropping window.

In HEVC, a coded picture may be defined as a coded representation of a picture containing all coding tree units of the picture. In HEVC, an access unit (AU) may be defined as a set of NAL units that are associated with each other according to a specified classification rule, are consecutive in decoding order, and contain at most one picture with any specific value of nuh_layer_id. In addition to containing the VCL NAL units of the coded picture, an access unit may also contain non-VCL NAL units.

It may be required that coded pictures appear in certain order within an access unit. For example a coded picture with nuh_layer_id equal to nuhLayerIdA may be required to precede, in decoding order, all coded pictures with nuh_layer_id greater than nuhLayerIdA in the same access unit. An AU typically contains all the coded pictures that represent the same output time and/or capturing time.

A bitstream may be defined as a sequence of bits, in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. The end of the first bitstream may be indicated by a specific NAL unit, which may be referred to as the end of bitstream (EOB) NAL unit and which is the last NAL unit of the bitstream. In HEVC and its current draft extensions, the EOB NAL unit is required to have nuh_layer_id equal to 0.

A byte stream format has been specified in H.264/AVC and HEVC for transmission or storage environments that do not provide framing structures. The byte stream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to, for example, enable straightforward gateway operation between packet- and stream-oriented systems, start code emulation prevention may always be performed regardless of whether the byte stream format is in use or not.

NAL units consist of a header and payload. In H.264/AVC and HEVC, the NAL unit header indicates the type of the NAL unit.

In HEVC, a coded video sequence (CVS) may be defined, for example, as a sequence of access units that consists, in decoding order, of an IRAP access unit with NoRaslOutputFlag equal to 1, followed by zero or more access units that are not IRAP access units with NoRaslOutputFlag equal to 1, including all subsequent access units up to but not including any subsequent access unit that is an IRAP access unit with NoRaslOutputFlag equal to 1. An IRAP access unit may be defined as an access unit in which the base layer picture is an IRAP picture. The value of NoRaslOutputFlag is equal to 1 for each IDR picture, each BLA picture, and each IRAP picture that is the first picture in that particular layer in the bitstream in decoding order, is the first IRAP picture that follows an end of sequence NAL unit having the same value of nuh_layer_id in decoding order. In multi-layer HEVC, the value of NoRaslOutputFlag is equal to 1 for each IRAP picture when its nuh_layer_id is such that LayerInitializedFlag[nuh_layer_id] is equal to 0 and LayerInitializedFlag[refLayerId] is equal to 1 for all values of refLayerId equal to IdDirectRefLayer[nuh_layer_id][j], where j is in the range of 0 to NumDirectRefLayers[nuh_layer_id]−1, inclusive. Otherwise, the value of NoRaslOutputFlag is equal to HandleCraAsBlaFlag. NoRaslOutputFlag equal to 1 has an impact that the RASL pictures associated with the IRAP picture for which the NoRaslOutputFlag is set are not output by the decoder. There may be means to provide the value of HandleCraAsBlaFlag to the decoder from an external entity, such as a player or a receiver, which may control the decoder. HandleCraAsBlaFlag may be set to 1 for example by a player that seeks to a new position in a bitstream or tunes into a broadcast and starts decoding and then starts decoding from a CRA picture. When HandleCraAsBlaFlag is equal to 1 for a CRA picture, the CRA picture is handled and decoded as if it were a BLA picture.

In HEVC, a coded video sequence may additionally or alternatively (to the specification above) be specified to end, when a specific NAL unit, which may be referred to as an end of sequence (EOS) NAL unit, appears in the bitstream and has nuh_layer_id equal to 0.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An HEVC decoder can recognize an intra picture starting an open GOP, because a specific NAL unit type, CRA NAL unit type, may be used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP may start from an IDR picture. In HEVC a closed GOP may also start from a BLA_W_RADL or a BLA_N_LP picture. An open GOP coding structure is potentially more efficient in the compression compared to a closed GOP coding structure, due to a larger flexibility in selection of reference pictures.

A Structure of Pictures (SOP) may be defined as one or more coded pictures consecutive in decoding order, in which the first coded picture in decoding order is a reference picture at the lowest temporal sub-layer and no coded picture except potentially the first coded picture in decoding order is a RAP picture. All pictures in the previous SOP precede in decoding order all pictures in the current SOP and all pictures in the next SOP succeed in decoding order all pictures in the current SOP. A SOP may represent a hierarchical and repetitive inter prediction structure. The term group of pictures (GOP) may sometimes be used interchangeably with the term SOP and having the same semantics as the semantics of SOP.

The bitstream syntax of H.264/AVC and HEVC indicates whether a particular picture is a reference picture for inter prediction of any other picture. Pictures of any coding type (I, P, B) can be reference pictures or non-reference pictures in H.264/AVC and HEVC.

In HEVC, a reference picture set (RPS) syntax structure and decoding process are used. A reference picture set valid or active for a picture includes all the reference pictures used as reference for the picture and all the reference pictures that are kept marked as "used for reference" for any subsequent pictures in decoding order. There are six subsets of the reference picture set, which are referred to as namely RefPicSetStCurr0 (a.k.a. RefPicSetStCurrBefore), RefPicSetStCurr1 (a.k.a. RefPicSetStCurrAfter), RefPicSetStFoll0, RefPicSetStFoll1, RefPicSetLtCurr, and RefPicSetLtFoll. RefPicSetStFoll0 and RefPicSetStFoll1 may also be considered to form jointly one subset RefPicSetStFoll. The notation of the six subsets is as follows. "Curr" refers to reference pictures that are included in the reference picture lists of the current picture and hence may be used as inter prediction reference for the current picture. "Foll" refers to reference pictures that are not included in the reference picture lists of the current picture but may be used in subsequent pictures in decoding order as reference pictures. "St" refers to short-term reference pictures, which may generally be identified through a certain number of least significant bits of their POC value. "Lt" refers to long-term reference pictures, which are specifically identified and generally have a greater difference of POC values relative to the current picture than what can be represented by the mentioned certain number of least significant bits. "0" refers to those reference pictures that have a smaller POC value than that of the current picture. "1" refers to those reference pictures that have a greater POC value than that of the current picture. RefPicSetStCurr0, RefPicSetStCurr1, RefPicSetStFoll0 and RefPicSetStFoll1 are collectively referred to as the short-term subset of the reference picture set. RefPicSetLtCurr and RefPicSetLtFoll are collectively referred to as the long-term subset of the reference picture set.

In HEVC, a reference picture set may be specified in a sequence parameter set and taken into use in the slice header through an index to the reference picture set. A reference picture set may also be specified in a slice header. A reference picture set may be coded independently or may be predicted from another reference picture set (known as inter-RPS prediction). In both types of reference picture set coding, a flag (used_by_curr_pic_X_flag) is additionally sent for each reference picture indicating whether the reference picture is used for reference by the current picture (included in a *Curr list) or not (included in a *Foll list). Pictures that are included in the reference picture set used by the current slice are marked as "used for reference", and pictures that are not in the reference picture set used by the current slice are marked as "unused for reference". If the current picture is an IDR picture, RefPicSetStCurr0, RefPicSetStCurr1, RefPicSetStFoll0, RefPicSetStFoll1, RefPicSetLtCurr, and RefPicSetLtFoll are all set to empty.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

In many coding modes of H.264/AVC and HEVC, the reference picture for inter prediction is indicated with an index to a reference picture list. The index may be coded with variable length coding, which usually causes a smaller index to have a shorter value for the corresponding syntax element. In H.264/AVC and HEVC, two reference picture lists (reference picture list 0 and reference picture list 1) are generated for each bi-predictive (B) slice, and one reference picture list (reference picture list 0) is formed for each inter-coded (P) slice.

A reference picture list, such as reference picture list 0 and reference picture list 1, is typically constructed in two steps: First, an initial reference picture list is generated. The initial reference picture list may be generated for example on the basis of frame_num, POC, temporal_id (or TemporalId or alike), or information on the prediction hierarchy such as GOP structure, or any combination thereof. Second, the initial reference picture list may be reordered by reference picture list reordering (RPLR) commands, also known as reference picture list modification syntax structure, which may be contained in slice headers. If reference picture sets are used, the reference picture list 0 may be initialized to contain RefPicSetStCurr0 first, followed by RefPicSetStCurr1, followed by RefPicSetLtCurr. Reference picture list 1 may be initialized to contain RefPicSetStCurr1 first, followed by RefPicSetStCurr0. In HEVC, the initial reference picture lists may be modified through the reference picture list modification syntax structure, where pictures in the initial reference picture lists may be identified through an entry index to the list. In other words, in HEVC, reference picture list modification is encoded into a syntax structure comprising a loop over each entry in the final reference picture list, where each loop entry is a fixed-length coded index to the initial reference picture list and indicates the picture in ascending position order in the final reference picture list.

Many coding standards, including H.264/AVC and HEVC, may have decoding process to derive a reference picture index to a reference picture list, which may be used to indicate which one of the multiple reference pictures is used for inter prediction for a particular block. A reference picture index may be coded by an encoder into the bitstream is some inter coding modes or it may be derived (by an encoder and a decoder) for example using neighbouring blocks in some other inter coding modes.

In order to represent motion vectors efficiently in bitstreams, motion vectors may be coded differentially with respect to a block-specific predicted motion vector. In many video codecs, the predicted motion vectors are created in a predefined way, for example by calculating the median of the encoded or decoded motion vectors of the adjacent blocks. Another way to create motion vector predictions, sometimes referred to as advanced motion vector prediction (AMVP), is to generate a list of candidate predictions from adjacent blocks and/or co-located blocks in temporal reference pictures and signalling the chosen candidate as the motion vector predictor. In addition to predicting the motion vector values, the reference index of previously coded/decoded picture can be predicted. The reference index is typically predicted from adjacent blocks and/or co-located blocks in temporal reference picture. Differential coding of motion vectors is typically disabled across slice boundaries.

Scalable video coding may refer to coding structure where one bitstream can contain multiple representations of the content, for example, at different bitrates, resolutions or frame rates. In these cases the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A meaningful decoded representation can be produced by decoding only certain parts of a scalable bit stream. A scalable bitstream typically consists of a "base layer" providing the lowest quality video available and one or more enhancement layers that enhance the video quality when received and decoded together with the lower layers. In order to improve coding efficiency for the enhancement layers, the coded representation of that layer typically depends on the lower layers. E.g. the motion and mode information of the enhancement layer can be predicted from lower layers. Similarly the pixel data of the lower layers can be used to create prediction for the enhancement layer.

In some scalable video coding schemes, a video signal can be encoded into a base layer and one or more enhancement layers. An enhancement layer may enhance, for example, the temporal resolution (i.e., the frame rate), the spatial resolution, or simply the quality of the video content represented by another layer or part thereof. Each layer together with all its dependent layers is one representation of the video signal, for example, at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

Scalability modes or scalability dimensions may include but are not limited to the following:

Quality scalability: Base layer pictures are coded at a lower quality than enhancement layer pictures, which may be achieved for example using a greater quantization parameter value (i.e., a greater quantization step size for transform coefficient quantization) in the base layer than in the enhancement layer.

Spatial scalability: Base layer pictures are coded at a lower resolution (i.e. have fewer samples) than enhancement layer pictures. Spatial scalability and quality scalability, particularly its coarse-grain scalability type, may sometimes be considered the same type of scalability.

Bit-depth scalability: Base layer pictures are coded at lower bit-depth (e.g. 8 bits) than enhancement layer pictures (e.g. 10 or 12 bits).

Dynamic range scalability: Scalable layers represent a different dynamic range and/or images obtained using a different tone mapping function and/or a different optical transfer function.

Chroma format scalability: Base layer pictures provide lower spatial resolution in chroma sample arrays (e.g. coded in 4:2:0 chroma format) than enhancement layer pictures (e.g. 4:4:4 format).

Color gamut scalability: enhancement layer pictures have a richer/broader color representation range than that of the base layer pictures—for example the enhancement layer may have UHDTV (ITU-R BT.2020) color gamut and the base layer may have the ITU-R BT.709 color gamut.

View scalability, which may also be referred to as multiview coding. The base layer represents a first view, whereas an enhancement layer represents a second view.

Depth scalability, which may also be referred to as depth-enhanced coding. A layer or some layers of a bitstream may represent texture view(s), while other layer or layers may represent depth view(s).

Region-of-interest scalability (as described below).

Interlaced-to-progressive scalability (also known as field-to-frame scalability): coded interlaced source content material of the base layer is enhanced with an enhancement layer to represent progressive source content.

Hybrid codec scalability (also known as coding standard scalability): In hybrid codec scalability, the bitstream syntax, semantics and decoding process of the base layer and the enhancement layer are specified in different video coding standards. Thus, base layer pictures are coded according to a different coding standard or format than enhancement layer pictures. For example, the base layer may be coded with H.264/AVC and an enhancement layer may be coded with an HEVC multi-layer extension.

It should be understood that many of the scalability types may be combined and applied together. For example color gamut scalability and bit-depth scalability may be combined.

The term layer may be used in context of any type of scalability, including view scalability and depth enhancements. An enhancement layer may refer to any type of an enhancement, such as SNR, spatial, multiview, depth, bit-depth, chroma format, and/or color gamut enhancement. A base layer may refer to any type of a base video sequence, such as a base view, a base layer for SNR/spatial scalability, or a texture base view for depth-enhanced video coding.

Various technologies for providing three-dimensional (3D) video content are currently investigated and developed. It may be considered that in stereoscopic or two-view video, one video sequence or view is presented for the left eye while a parallel view is presented for the right eye. More than two parallel views may be needed for applications which enable viewpoint switching or for autostereoscopic displays which may present a large number of views simultaneously and let the viewers to observe the content from different viewpoints.

A view may be defined as a sequence of pictures representing one camera or viewpoint. The pictures representing a view may also be called view components. In other words, a view component may be defined as a coded representation of a view in a single access unit. In multiview video coding, more than one view is coded in a bitstream. Since views are typically intended to be displayed on stereoscopic or multiview autostrereoscopic display or to be used for other 3D arrangements, they typically represent the same scene and are content-wise partly overlapping although representing different viewpoints to the content. Hence, inter-view prediction may be utilized in multiview video coding to take advantage of inter-view correlation and improve compression efficiency. One way to realize inter-view prediction is to include one or more decoded pictures of one or more other views in the reference picture list(s) of a picture being coded or decoded residing within a first view. View scalability may refer to such multiview video coding or multiview video bitstreams, which enable removal or omission of one or more coded views, while the resulting bitstream remains conforming and represents video with a smaller number of views than originally. Region of Interest (ROI) coding may be defined to refer to coding a particular region within a video at a higher fidelity.

ROI scalability may be defined as a type of scalability wherein an enhancement layer enhances only part of a reference-layer picture e.g. spatially, quality-wise, in bit-depth, and/or along other scalability dimensions. As ROI scalability may be used together with other types of scalabilities, it may be considered to form a different categorization of scalability types. There exists several different applications for ROI coding with different requirements, which may be realized by using ROI scalability. For example, an enhancement layer can be transmitted to enhance the quality and/or a resolution of a region in the base layer. A decoder receiving both enhancement and base layer bitstream might decode both layers and overlay the decoded pictures on top of each other and display the final picture.

In signal processing, resampling of images is usually understood as changing the sampling rate of the current image in horizontal or/and vertical directions. Resampling results in a new image which is represented with different number of pixels in horizontal or/and vertical direction. In some applications, the process of image resampling is equal to image resizing. In general, resampling is classified in two processes: downsampling and upsampling.

Downsampling or subsampling process may be defined as reducing the sampling rate of a signal, and it typically results in reducing of the image sizes in horizontal and/or vertical directions. In image downsampling, the spatial resolution of the output image, i.e. the number of pixels in the output image, is reduced compared to the spatial resolution of the input image. Downsampling ratio may be defined as the horizontal or vertical resolution of the downsampled image divided by the respective resolution of the input image for downsampling. Downsampling ratio may alternatively be defined as the number of samples in the downsampled image divided by the number of samples in the input image for downsampling. As the two definitions differ, the term downsampling ratio may further be characterized by indicating whether it is indicated along one coordinate axis or both coordinate axes (and hence as a ratio of number of pixels in the images). Image downsampling may be performed for example by decimation, i.e. by selecting a specific number of pixels, based on the downsampling ratio, out of the total number of pixels in the original image. In some embodiments downsampling may include low-pass filtering or other filtering operations, which may be performed before or after image decimation. Any low-pass filtering method may be used, including but not limited to linear averaging.

Upsampling process may be defined as increasing the sampling rate of the signal, and it typically results in increasing of the image sizes in horizontal and/or vertical directions. In image upsampling, the spatial resolution of the output image, i.e. the number of pixels in the output image, is increased compared to the spatial resolution of the input image. Upsampling ratio may be defined as the horizontal or vertical resolution of the upsampled image divided by the respective resolution of the input image. Upsampling ratio may alternatively be defined as the number of samples in the upsampled image divided by the number of samples in the input image. As the two definitions differ, the term upsampling ratio may further be characterized by indicating whether it is indicated along one coordinate axis or both coordinate axes (and hence as a ratio of number of pixels in the images). Image upsampling may be performed for example by copying or interpolating pixel values such that the total number of pixels is increased. In some embodiments, upsampling may include filtering operations, such as edge enhancement filtering.

Frame packing may be defined to comprise arranging more than one input picture, which may be referred to as (input) constituent frames, into an output picture. In general, frame packing is not limited to any particular type of constituent frames or the constituent frames need not have a particular relation with each other. In many cases, frame packing is used for arranging constituent frames of a stereoscopic video clip into a single picture sequence, as explained in more details in the next paragraph. The arranging may include placing the input pictures in spatially non-overlapping areas within the output picture. For example, in a side-by-side arrangement, two input pictures are placed within an output picture horizontally adjacently to each other. The arranging may also include partitioning of one or more input pictures into two or more constituent frame partitions and placing the constituent frame partitions in spatially non-overlapping areas within the output picture. The output picture or a sequence of frame-packed output pictures may be encoded into a bitstream e.g. by a video encoder. The bitstream may be decoded e.g. by a video decoder. The decoder or a post-processing operation after decoding may extract the decoded constituent frames from the decoded picture(s) e.g. for displaying.

In frame-compatible stereoscopic video (a.k.a. frame packing of stereoscopic video), a spatial packing of a stereo pair into a single frame is performed at the encoder side as a pre-processing step for encoding and then the frame-packed frames are encoded with a conventional 2D video coding scheme. The output frames produced by the decoder contain constituent frames of a stereo pair.

In a typical operation mode, the spatial resolution of the original frames of each view and the packaged single frame have the same resolution. In this case the encoder down-samples the two views of the stereoscopic video before the packing operation. The spatial packing may use for example a side-by-side or top-bottom format, and the downsampling should be performed accordingly.

A coding tool or mode called intra block copy (IBC) is similar to inter prediction but uses the current picture being encoded or decoded as a reference picture. Obviously, only the blocks coded or decoded before the current block being coded or decoded can be used as references for the prediction. The screen content coding (SCC) extension of HEVC includes IBC.

The motion vector prediction of H.265/HEVC is described below as an example of a system or method where embodiments may be applied.

H.265/HEVC includes two motion vector prediction schemes, namely the advanced motion vector prediction (AMVP) and the merge mode. In the AMVP or the merge mode, a list of motion vector candidates is derived for a PU. There are two kinds of candidates: spatial candidates and temporal candidates, where temporal candidates may also be referred to as TMVP candidates. The sources of the candidate motion vector predictors are presented in FIGS. 5a and 5b. X stands for the current prediction unit. $A_0$, $A_1$, $B_0$, $B_1$, $B_2$ in FIG. 5a are spatial candidates while $C_0$, $C_1$ in FIG. 5b are temporal candidates. The block comprising or corresponding to the candidate $C_0$ or $C_1$ in FIG. 5b, whichever is the source for the temporal candidate, may be referred to as the collocated block.

A candidate list derivation may be performed for example as follows, while it should be understood that other possibilities may exist for candidate list derivation. If the occupancy of the candidate list is not at maximum, the spatial candidates are included in the candidate list first if they are available and not already exist in the candidate list. After that, if occupancy of the candidate list is not yet at maximum, a temporal candidate is included in the candidate list. If the number of candidates still does not reach the maximum allowed number, the combined bi-predictive candidates (for B slices) and a zero motion vector are added in. After the candidate list has been constructed, the encoder decides the final motion information from candidates for example based on a rate-distortion optimization (RDO) decision and encodes the index of the selected candidate into the bitstream. Likewise, the decoder decodes the index of the selected candidate from the bitstream, constructs the candidate list, and uses the decoded index to select a motion vector predictor from the candidate list.

One of the candidates in the merge list and/or the candidate list for AMVP or any similar motion vector candidate list may be a TMVP candidate or alike, which may be derived from the collocated block within an indicated or inferred reference picture, such as the reference picture indicated for example in the slice header. In HEVC, the reference picture list to be used for obtaining a collocated partition is chosen according to the collocated_from_l0_flag syntax element in the slice header. When the flag is equal to 1, it specifies that the picture that contains the collocated partition is derived from list 0, otherwise the picture is derived from list 1. When collocated_from_l0_flag is not present, it is inferred to be equal to 1. The collocated_ref_idx in the slice header specifies the reference index of the picture that contains the collocated partition. When the current slice is a P slice, collocated_ref_idx refers to a picture in list 0. When the current slice is a B slice, collocated_ref_idx refers to a picture in list 0 if collocated_from_l0 is 1, otherwise it refers to a picture in list 1. collocated_ref_idx always refers to a valid list entry, and the resulting picture is the same for all slices of a coded picture. When collocated_ref_idx is not present, it is inferred to be equal to 0.

In HEVC the so-called target reference index for temporal motion vector prediction in the merge list is set as 0 when the motion coding mode is the merge mode. When the motion coding mode in HEVC utilizing the temporal motion vector prediction is the advanced motion vector prediction mode, the target reference index values are explicitly indicated (e.g. per each PU).

In HEVC, the availability of a candidate predicted motion vector (PMV) may be determined as follows (both for spatial and temporal candidates) (SRTP=short-term reference picture, LRTP=long-term reference picture):

| reference picture for target reference index | reference picture for candidate PMV | candidate PMV availability |
|---|---|---|
| STRP | STRP | "available" (and scaled) |
| STRP | LTRP | "unavailable" |
| LTRP | STRP | "unavailable" |
| LTRP | LTRP | "available" (but not scaled) |

In HEVC, when the target reference index value has been determined, the motion vector value of the temporal motion vector prediction may be derived as follows: The motion vector PMV at the block that is collocated with the bottom-right neighbor (location C0 in FIG. 5b) of the current prediction unit is obtained. The picture where the collocated block resides may be e.g. determined according to the signalled reference index in the slice header as described above. If the PMV at location C0 is not available, the motion vector PMV at location C1 (see FIG. 5b) of the collocated picture is obtained. The determined available motion vector PMV at the co-located block is scaled with respect to the ratio of a first picture order count difference and a second picture order count difference. The first picture order count difference is derived between the picture containing the co-located block and the reference picture of the motion vector of the co-located block. The second picture order count difference is derived between the current picture and the target reference picture. If one but not both of the target reference picture and the reference picture of the motion vector of the collocated block is a long-term reference picture (while the other is a short-term reference picture), the TMVP candidate may be considered unavailable. If both of the target reference picture and the reference picture of the motion vector of the collocated block are long-term reference pictures, no POC-based motion vector scaling may be applied.

Motion parameter types or motion information may include but are not limited to one or more of the following types:

- an indication of a prediction type (e.g. intra prediction, uni-prediction, bi-prediction) and/or a number of reference pictures;
- an indication of a prediction direction, such as inter (a.k.a. temporal) prediction, inter-layer prediction, inter-view prediction, view synthesis prediction (VSP), and inter-component prediction (which may be indicated per reference picture and/or per prediction type and where in some embodiments inter-view and view-synthesis prediction may be jointly considered as one prediction direction) and/or
- an indication of a reference picture type, such as a short-term reference picture and/or a long-term reference picture and/or an inter-layer reference picture (which may be indicated e.g. per reference picture)
- a reference index to a reference picture list and/or any other identifier of a reference picture (which may be indicated e.g. per reference picture and the type of which may depend on the prediction direction and/or the reference picture type and which may be accompanied by other relevant pieces of information, such as the reference picture list or alike to which reference index applies);
- a horizontal motion vector component (which may be indicated e.g. per prediction block or per reference index or alike);
- a vertical motion vector component (which may be indicated e.g. per prediction block or per reference index or alike);
- one or more parameters, such as picture order count difference and/or a relative camera separation between the picture containing or associated with the motion parameters and its reference picture, which may be used for scaling of the horizontal motion vector component and/or the vertical motion vector component in one or more motion vector prediction processes (where said one or more parameters may be indicated e.g. per each reference picture or each reference index or alike);
- coordinates of a block to which the motion parameters and/or motion information applies, e.g. coordinates of the top-left sample of the block in luma sample units;
- extents (e.g. a width and a height) of a block to which the motion parameters and/or motion information applies.

In general, motion vector prediction mechanisms, such as those motion vector prediction mechanisms presented above as examples, may include prediction or inheritance of certain pre-defined or indicated motion parameters.

A motion field associated with a picture may be considered to comprise of a set of motion information produced for every coded block of the picture. A motion field may be accessible by coordinates of a block, for example. A motion field may be used for example in TMVP or any other motion prediction mechanism where a source or a reference for prediction other than the current (de)coded picture is used.

Different spatial granularity or units may be applied to represent and/or store a motion field. For example, a regular grid of spatial units may be used. For example, a picture may be divided into rectangular blocks of certain size (with the possible exception of blocks at the edges of the picture, such as on the right edge and the bottom edge). For example, the size of the spatial unit may be equal to the smallest size for which a distinct motion can be indicated by the encoder in the bitstream, such as a 4×4 block in luma sample units. For example, a so-called compressed motion field may be used, where the spatial unit may be equal to a pre-defined or indicated size, such as a 16×16 block in luma sample units, which size may be greater than the smallest size for indicating distinct motion. For example, an HEVC encoder and/or decoder may be implemented in a manner that a motion data storage reduction (MDSR) or motion field compression is performed for each decoded motion field (prior to using the motion field for any prediction between pictures). In an HEVC implementation, MDSR may reduce the granularity of motion data to 16×16 blocks in luma sample units by keeping the motion applicable to the top-left sample of the 16×16 block in the compressed motion field. The encoder may encode indication(s) related to the spatial unit of the compressed motion field as one or more syntax elements and/or syntax element values for example in a sequence-level syntax structure, such as a video parameter set or a sequence parameter set. In some (de)coding methods and/or devices, a motion field may be represented and/or stored according to the block partitioning of the motion prediction (e.g. according to prediction units of the HEVC standard). In some (de)coding methods and/or devices, a combination of a regular grid and block partitioning may be applied so that motion associated with partitions greater than a pre-defined or indicated spatial unit size is represented and/or stored associated with those partitions, whereas motion associated with partitions smaller than or unaligned with a pre-defined or indicated spatial unit size or grid is represented and/or stored for the pre-defined or indicated units.

The scalable video coding extension (SHVC) of HEVC provides a mechanism for offering spatial, bit-depth, color gamut, and quality scalability while exploiting the inter-layer redundancy. The multiview extension (MV-HEVC) of HEVC enables coding of multiview video data suitable e.g. for stereoscopic displays.

SHVC and MV-HEVC enable two types of inter-layer prediction, namely sample and motion prediction. In the inter-layer sample prediction, the inter-layer reference (ILR) picture is used to obtain the sample values of a prediction block. In MV-HEVC, the decoded base-layer picture acts, without modifications, as an ILR picture. In spatial and color gamut scalability of SHVC, inter-layer processing, such as resampling, is applied to the decoded base-layer picture to obtain an ILR picture. In the resampling process of SHVC, the base-layer picture may be cropped, upsampled and/or padded to obtain an ILR picture. The relative position of the upsampled base-layer picture to the enhancement layer picture is indicated through so-called reference layer location offsets. This feature enables region-of-interest (ROI) scalability, in which only subset of the picture area of the base layer is enhanced in an enhancement layer picture.

Inter-layer motion prediction exploits the temporal motion vector prediction (TMVP) mechanism of HEVC. The ILR picture is assigned as the collocated picture for TMVP, and hence is the source of TMVP candidates in the motion vector prediction process. In spatial scalability of SHVC, motion field mapping (MFM) is used to obtain the motion information for the ILR picture from that of the base-layer picture. In MFM, the prediction dependency in base-layer pictures may be considered to be duplicated to generate the reference picture list(s) for ILR pictures. For each block of a remapped motion field with a particular block grid (e.g. a 16×16 grid in HEVC), a collocated sample location in the source picture for inter-layer prediction may be derived. The reference sample location may for example be derived for the center-most sample of the block. In derivation of the reference sample location, the resampling ratio, the reference region, and the resampled reference region can be taken into account—see further below for the definition of the resampling ratio, the reference region, and the resampled reference region. Moreover, the reference sample location may be rounded or truncated to be aligned with the block grid of the motion field of the reference region or the source picture for inter-layer prediction. The motion vector corresponding to the reference sample location is obtained from the motion field of the reference region or the source picture for inter-layer prediction. This motion vector is re-scaled according to the resampling ratio and then included in the remapped motion field. The remapped motion field can be subsequently used as a source for TMVP or alike. In contrast, MFM is not applied in MV-HEVC for base-view pictures to be referenced during the inter-layer motion prediction process.

The spatial correspondence of a reference-layer picture and an enhancement-layer picture may be inferred or may be indicated with one or more types of so-called reference layer location offsets. In HEVC, reference layer location offsets may be included in the PPS by the encoder and decoded from the PPS by the decoder. Reference layer location offsets may be used for but are not limited to achieving region-of-interest (ROI) scalability. Reference layer location offsets may be indicated between two layers or pictures of two layers even if the layers do not have an inter-layer prediction relation between each other. Reference layer location offsets may comprise one or more of scaled reference layer offsets, reference region offsets, and resampling phase sets. Scaled reference layer offsets may be considered to specify the horizontal and vertical offsets between the sample in the current picture that is collocated with the top-left luma sample of the reference region in a decoded picture in a reference layer and the horizontal and vertical offsets between the sample in the current picture that is collocated with the bottom-right luma sample of the reference region in a decoded picture in a reference layer. Another way is to consider scaled reference layer offsets to specify the positions of the corner samples of the upsampled reference region (or more generally, the resampled reference region) relative to the respective corner samples of the enhancement layer picture. The scaled reference layer offsets can be considered to specify the spatial correspondence of the current layer picture (for which the reference layer location offsets are indicated) relative to the scaled reference region of the scaled reference layer picture. The scaled reference layer offset values may be signed and are generally allowed to be equal to 0. When scaled reference layer offsets are negative, the picture for which the reference layer location offsets are indicated corresponds to a cropped area of the reference layer picture. Reference region offsets may be considered to specify the horizontal and vertical offsets between the top-left luma sample of the reference region in the decoded picture in a reference layer and the top-left luma sample of the same decoded picture as well as the horizontal and vertical offsets between the bottom-right luma sample of the reference region in the decoded picture in a reference layer and the bottom-right luma sample of the same decoded picture. The reference region offsets can be considered to specify the spatial correspondence of the reference region in the reference layer picture relative to the decoded reference layer picture. The reference region offset values may be signed and are generally allowed to be equal to 0. When reference region offsets are negative, the reference layer picture corresponds to a cropped area of the picture for which the reference layer location offsets are indicated. A resampling phase set may be considered to specify the phase offsets used in resampling process of a source picture for inter-layer prediction. Different phase offsets may be provided for luma and chroma components.

Figure 6B:
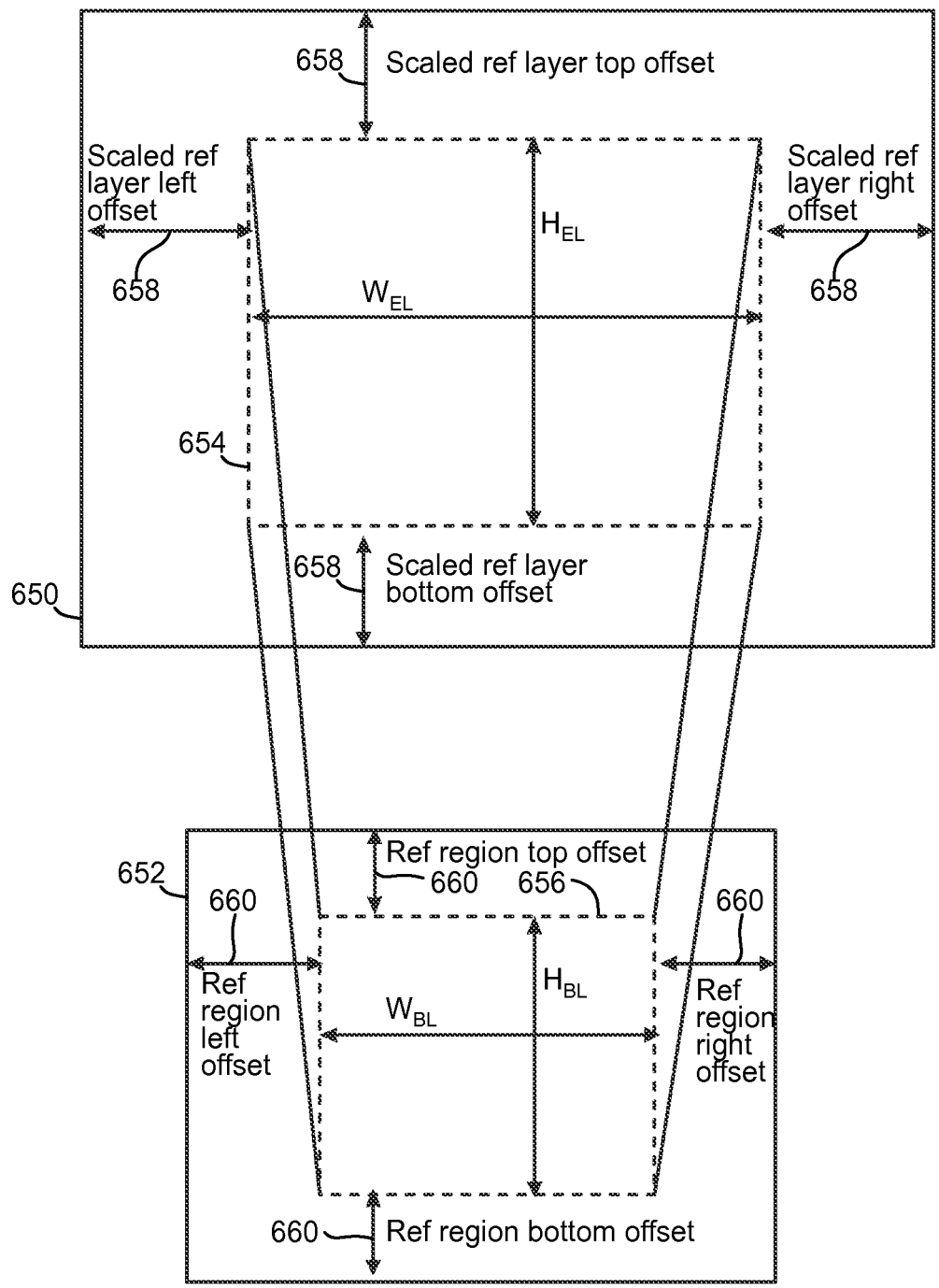
FIG. 6b illustrates the relation of reference region offsets and scaled reference layer offsets, in accordance with an embodiment.

FIG. 6b illustrates the relation of reference region offsets 658 and scaled reference layer offsets 660. In this example, the reference layer locations offsets 658 are indicated for an enhancement layer (EL) picture 650 in relation to a base layer (BL) picture 652. In FIG. 6b, the resampled reference region is indicated with the dashed rectangle 654 within the EL picture 650. A horizontal resampling ratio may be defined to be equal to $W_{EL}/W_{BL}$. A vertical resampling ratio may be defined to be equal to $H_{EL}/H_{BL}$.

Scalability may be enabled in two basic ways. Either by introducing new coding modes for performing prediction of pixel values or syntax from lower layers of the scalable representation or by placing the lower layer pictures to a reference picture buffer (e.g. a decoded picture buffer, DPB) of the higher layer. The first approach may be more flexible and thus may provide better coding efficiency in most cases. However, the second, reference frame based scalability, approach may be implemented efficiently with minimal changes to single layer codecs while still achieving majority of the coding efficiency gains available. Essentially a reference frame based scalability codec may be implemented by utilizing the same hardware or software implementation for all the layers, just taking care of the DPB management by external means.

A scalable video encoder for quality scalability (also known as Signal-to-Noise or SNR) and/or spatial scalability may be implemented as follows. For a base layer, a conventional non-scalable video encoder and decoder may be used. The reconstructed/decoded pictures of the base layer are included in the reference picture buffer and/or reference picture lists for an enhancement layer. In case of spatial scalability, the reconstructed/decoded base-layer picture may be upsampled prior to its insertion into the reference picture lists for an enhancement-layer picture. The base layer decoded pictures may be inserted into a reference picture list(s) for coding/decoding of an enhancement layer picture similarly to the decoded reference pictures of the enhancement layer. Consequently, the encoder may choose a base-layer reference picture as an inter prediction reference and indicate its use with a reference picture index in the coded bitstream. The decoder decodes from the bitstream, for example from a reference picture index, that a base-layer picture is used as an inter prediction reference for the enhancement layer. When a decoded base-layer picture is used as the prediction reference for an enhancement layer, it is referred to as an inter-layer reference picture.

While the previous paragraph described a scalable video codec with two scalability layers with an enhancement layer and a base layer, it needs to be understood that the description can be generalized to any two layers in a scalability hierarchy with more than two layers. In this case, a second enhancement layer may depend on a first enhancement layer in encoding and/or decoding processes, and the first enhancement layer may therefore be regarded as the base layer for the encoding and/or decoding of the second enhancement layer. Furthermore, it needs to be understood that there may be inter-layer reference pictures from more than one layer in a reference picture buffer or reference picture lists of an enhancement layer, and each of these inter-layer reference pictures may be considered to reside in a base layer or a reference layer for the enhancement layer being encoded and/or decoded. Furthermore, it needs to be understood that other types of inter-layer processing than reference-layer picture upsampling may take place instead or additionally. For example, the bit-depth of the samples of the reference-layer picture may be converted to the bit-depth of the enhancement layer and/or the sample values may undergo a mapping from the color space of the reference layer to the color space of the enhancement layer.

A scalable video coding and/or decoding scheme may use multi-loop coding and/or decoding, which may be characterized as follows. In the encoding/decoding, a base layer picture may be reconstructed/decoded to be used as a motion-compensation reference picture for subsequent pictures, in coding/decoding order, within the same layer or as a reference for inter-layer (or inter-view or inter-component) prediction. The reconstructed/decoded base layer picture may be stored in the DPB. An enhancement layer picture may likewise be reconstructed/decoded to be used as a motion-compensation reference picture for subsequent pictures, in coding/decoding order, within the same layer or as reference for inter-layer (or inter-view or inter-component) prediction for higher enhancement layers, if any. In addition to reconstructed/decoded sample values, syntax element values of the base/reference layer or variables derived from the syntax element values of the base/reference layer may be used in the inter-layer/inter-component/inter-view prediction.

Inter-layer prediction may be defined as prediction in a manner that is dependent on data elements (e.g., sample values or motion vectors) of reference pictures from a different layer than the layer of the current picture (being encoded or decoded). Many types of inter-layer prediction exist and may be applied in a scalable video encoder/decoder. The available types of inter-layer prediction may for example depend on the coding profile according to which the bitstream or a particular layer within the bitstream is being encoded or, when decoding, the coding profile that the bitstream or a particular layer within the bitstream is indicated to conform to. Alternatively or additionally, the available types of inter-layer prediction may depend on the types of scalability or the type of an scalable codec or video coding standard amendment (e.g. SHVC, MV-HEVC, or 3D-HEVC) being used.

The types of prediction may comprise, but are not limited to, one or more of the following: sample prediction and motion prediction. In sample prediction, at least a subset of the reconstructed sample values of a reference picture are used for predicting sample values of the current picture. Sample prediction may be motion-compensated and/or disparity-compensated e.g. through the use of motion vectors. Sample prediction and inter prediction may sometimes be used interchangeably, while inter prediction may also be understood more generally to cover also types of inter-picture prediction in addition to sample prediction. In motion prediction, at least a subset of the motion vectors of a source picture for motion prediction (a.k.a. collocated pictures) are used as a reference for predicting motion vectors of the current picture. Typically, predicting information on which reference pictures are associated with the motion vectors is also included in motion prediction.

The types of inter-layer prediction may comprise, but are not limited to, one or more of the following: inter-layer sample prediction, inter-layer motion prediction, inter-layer residual prediction. In inter-layer sample prediction, at least a subset of the reconstructed sample values of a source picture for inter-layer prediction are used as a reference for predicting sample values of the current picture. In inter-layer motion prediction, at least a subset of the motion vectors of a source picture for inter-layer prediction are used as a reference for predicting motion vectors of the current picture. Typically, predicting information on which reference pictures are associated with the motion vectors is also included in inter-layer motion prediction. For example, the reference indices of reference pictures for the motion vectors may be inter-layer predicted and/or the picture order count or any other identification of a reference picture may be inter-layer predicted. In some cases, inter-layer motion prediction may also comprise prediction of block coding mode, header information, block partitioning, and/or other similar parameters. In some cases, coding parameter prediction, such as inter-layer prediction of block partitioning, may be regarded as another type of inter-layer prediction. In inter-layer residual prediction, the prediction error or residual of selected blocks of a source picture for inter-layer prediction is used for predicting the current picture. In multiview-plus-depth coding, such as 3D-HEVC, cross-component inter-layer prediction may be applied, in which a picture of a first type, such as a depth picture, may affect the inter-layer prediction of a picture of a second type, such as a conventional texture picture. For example, disparity-compensated inter-layer sample value and/or motion prediction may be applied, where the disparity may be at least partially derived from a depth picture.

A direct reference layer may be defined as a layer that may be used for inter-layer prediction of another layer for which the layer is the direct reference layer. A direct predicted layer may be defined as a layer for which another layer is a direct reference layer. An indirect reference layer may be defined as a layer that is not a direct reference layer of a second layer but is a direct reference layer of a third layer that is a direct reference layer or indirect reference layer of a direct reference layer of the second layer for which the layer is the indirect reference layer. An indirect predicted layer may be defined as a layer for which another layer is an indirect reference layer. An independent layer may be defined as a layer that does not have direct reference layers. In other words, an independent layer is not predicted using inter-layer prediction. A non-base layer may be defined as any other layer than the base layer, and the base layer may be defined as the lowest layer in the bitstream. An independent non-base layer may be defined as a layer that is both an independent layer and a non-base layer.

A source picture for inter-layer prediction may be defined as a decoded picture that either is, or is used in deriving, an inter-layer reference picture that may be used as a reference picture for prediction of the current picture. In multi-layer HEVC extensions, an inter-layer reference picture is included in an inter-layer reference picture set of the current picture. An inter-layer reference picture may be defined as a reference picture that may be used for inter-layer prediction of the current picture. In the coding and/or decoding process, the inter-layer reference pictures may be treated as long term reference pictures.

A source picture for inter-layer prediction may be required to be in the same access unit as the current picture. In some cases, e.g. when no resampling, motion field mapping or other inter-layer processing is needed, the source picture for inter-layer prediction and the respective inter-layer reference picture may be identical. In some cases, e.g. when resampling is needed to match the sampling grid of the reference layer to the sampling grid of the layer of the current picture (being encoded or decoded), inter-layer processing is applied to derive an inter-layer reference picture from the source picture for inter-layer prediction. Examples of such inter-layer processing are described in the next paragraphs.

Inter-layer sample prediction may be comprise resampling of the sample array(s) of the source picture for inter-layer prediction. The encoder and/or the decoder may derive a horizontal scale factor (e.g. stored in variable ScaleFactorX) and a vertical scale factor (e.g. stored in variable ScaleFactorY) for a pair of an enhancement layer and its reference layer for example based on the reference layer location offsets for the pair. If either or both scale factors are not equal to 1, the source picture for inter-layer prediction may be resampled to generate an inter-layer reference picture for predicting the enhancement layer picture. The process and/or the filter used for resampling may be pre-defined for example in a coding standard and/or indicated by the encoder in the bitstream (e.g. as an index among pre-defined resampling processes or filters) and/or decoded by the decoder from the bitstream. A different resampling process may be indicated by the encoder and/or decoded by the decoder and/or inferred by the encoder and/or the decoder depending on the values of the scale factor. For example, when both scale factors are less than 1, a pre-defined downsampling process may be inferred; and when both scale factors are greater than 1, a pre-defined upsampling process may be inferred. Additionally or alternatively, a different resampling process may be indicated by the encoder and/or decoded by the decoder and/or inferred by the encoder and/or the decoder depending on which sample array is processed. For example, a first resampling process may be inferred to be used for luma sample arrays and a second resampling process may be inferred to be used for chroma sample arrays.

SHVC enables the use of weighted prediction or a color-mapping process based on a 3D lookup table (LUT) for (but not limited to) color gamut scalability. The 3D LUT approach may be described as follows. The sample value range of each color components may be first split into two ranges, forming up to 2×2×2 octants, and then the luma ranges can be further split up to four parts, resulting into up to 8×2×2 octants. Within each octant, a cross color component linear model is applied to perform color mapping. For each octant, four vertices are encoded into and/or decoded from the bitstream to represent a linear model within the octant. The color-mapping table is encoded into and/or decoded from the bitstream separately for each color component. Color mapping may be considered to involve three steps: First, the octant to which a given reference-layer sample triplet (Y, Cb, Cr) belongs is determined. Second, the sample locations of luma and chroma may be aligned through applying a color component adjustment process. Third, the linear mapping specified for the determined octant is applied. The mapping may have cross-component nature, i.e. an input value of one color component may affect the mapped value of another color component. Additionally, if inter-layer resampling is also required, the input to the resampling process is the picture that has been color-mapped. The color-mapping may (but needs not to) map samples of a first bit-depth to samples of another bit-depth.

Inter-layer motion prediction may be realized as follows. A temporal motion vector prediction process, such as TMVP of H.265/HEVC, may be used to exploit the redundancy of motion data between different layers. This may be done as follows: when the decoded base-layer picture is upsampled, the motion data of the base-layer picture is also mapped to the resolution of an enhancement layer. If the enhancement layer picture utilizes motion vector prediction from the base layer picture e.g. with a temporal motion vector prediction mechanism such as TMVP of H.265/HEVC, the corresponding motion vector predictor is originated from the mapped base-layer motion field. This way the correlation between the motion data of different layers may be exploited to improve the coding efficiency of a scalable video coder. In SHVC and/or alike, inter-layer motion prediction may be performed by setting the inter-layer reference picture as the collocated reference picture for TMVP derivation.

Similarly to MVC, in MV-HEVC, inter-view reference pictures can be included in the reference picture list(s) of the current picture being coded or decoded. SHVC uses multi-loop decoding operation (unlike the SVC extension of H.264/AVC). SHVC may be considered to use a reference index based approach, i.e. an inter-layer reference picture can be included in a one or more reference picture lists of the current picture being coded or decoded (as described above).

For the enhancement layer coding, the concepts and coding tools of HEVC base layer may be used in SHVC, MV-HEVC, and/or alike. However, the additional inter-layer prediction tools, which employ already coded data (including reconstructed picture samples and motion parameters a.k.a motion information) in reference layer for efficiently coding an enhancement layer, may be integrated to SHVC, MV-HEVC, and/or alike codec.

A sender, a gateway, a client, or alike may select the transmitted layers and/or sub-layers of a scalable video bitstream. Terms layer extraction, extraction of layers, or layer down-switching may refer to transmitting fewer layers than what is available in the bitstream received by the sender, gateway, client, or alike. Layer up-switching may refer to transmitting additional layer(s) compared to those transmitted prior to the layer up-switching by the sender, gateway, client, or alike, i.e. restarting the transmission of one or more layers whose transmission was ceased earlier in layer down-switching. Similarly to layer down-switching and/or up-switching, the sender, gateway, client, or alike may perform down- and/or up-switching of temporal sub-layers. The sender, gateway client, or alike may also perform both layer and sub-layer down-switching and/or up-switching. Layer and sub-layer down-switching and/or up-switching may be carried out in the same access unit or alike (i.e. virtually simultaneously) or may be carried out in different access units or alike (i.e. virtually at distinct times).

360-degree panoramic content (i.e., images and video) cover horizontally the full 360-degree field-of-view around the capturing position of an imaging device. The vertical field-of-view may vary and can be e.g. 180 degrees. A specific projection for mapping a panoramic image covering 360-degree field-of-view horizontally and 180-degree field-of-view vertically (hence representing a sphere) to a rectangular two-dimensional image plane is known as equirectangular projection. In this case, the horizontal coordinate may be considered equivalent to a longitude, and the vertical coordinate may be considered equivalent to a latitude, with no transformation or scaling applied. In some cases panoramic content with 360-degree horizontal field-of-view but with less than 180-degree vertical field-of-view may be considered special cases of equirectangular projection, where the polar areas of the sphere have not been mapped onto the two-dimensional image plane. In some cases panoramic content may have less than 360-degree horizontal field-of-view and up to 180-degree vertical field-of-view, while otherwise have the characteristics of equirectangular projection format.

The equirectangular panorama format stretches the nadir and the zenith areas. The number of pixels towards the nadir or zenith is proportionally greater compared to that in the equator. This results into unnecessarily large number of pixels being encoded and decoded in the areas close to the nadir and zenith, which in turn increases encoding and decoding complexity and may result into a decreased rate-distortion performance.

Now in order to at least alleviate the above disadvantages as well as to bring other benefits as described below, a method involving regional resampling is presented hereinafter.

Figure 7A:
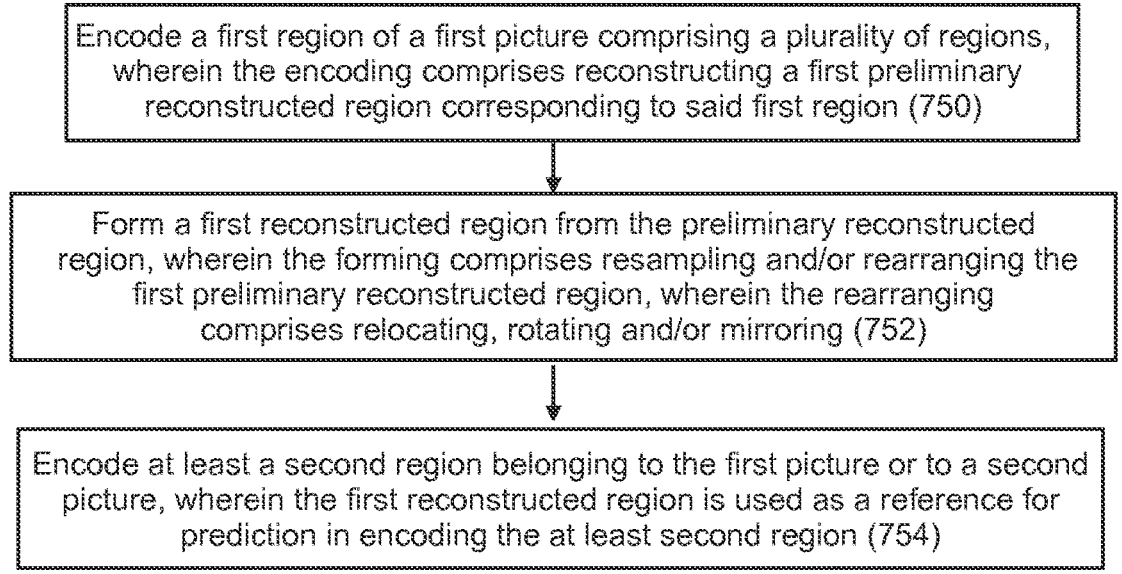
FIG. 7a shows a flow chart of an encoding method involving regional resampling in accordance with an embodiment.

In the method, which is disclosed in FIG. 7a as a flow diagram in accordance with an embodiment, a first region of the plurality of regions of a first picture is encoded (750), wherein said encoding comprises reconstructing a first preliminary reconstructed region corresponding to the first region. A first reconstructed region is formed (752) from the first preliminary reconstructed region by resampling and/or rearranging the first preliminary reconstructed region, wherein rearranging comprises relocating, rotating, and/or mirroring. The first reconstructed region is used (754) as a reference for prediction in encoding another region or regions of the first picture and/or a second picture.

Figure 7B:
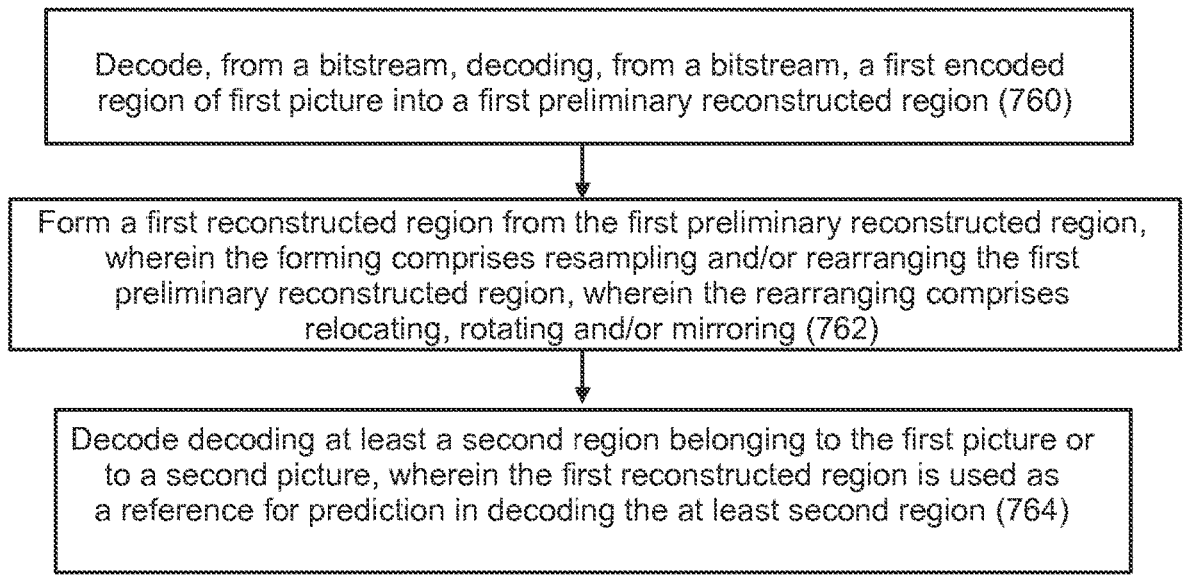
FIG. 7b shows a flow chart of a decoding method involving regional resampling according to an embodiment of the invention.

Correspondingly, a decoding method, which is disclosed in FIG. 7b as a flow diagram in accordance with an embodiment, comprises decoding (760) a first encoded region of a first picture into a first preliminary reconstructed region. A first reconstructed region is formed (762) from the first preliminary reconstructed region by resampling and/or rearranging the first preliminary reconstructed region, wherein rearranging comprises relocating, rotating, and/or mirroring. The first reconstructed region is used (764) as a reference for prediction in decoding another region or regions of the first picture and/or a second picture.

According to an embodiment, an initial picture comprises a plurality of regions. The first picture is formed from the initial picture by resampling and/or rearranging at least a first initial region of the plurality of regions into a first region. For example, a top stripe (e.g. 45-degrees vertical field of view) of an equirectangular panorama picture (acting as the first picture) may be horizontally downsampled when forming a first picture. The first region is encoded, wherein said encoding comprises reconstructing a first preliminary reconstructed region corresponding to the first region. A first reconstructed region is formed from the first preliminary reconstructed region by resampling and/or rearranging the first preliminary reconstructed region. For example, the reconstructed top stripe of the equirectangular panorama may be horizontally upsampled to its original resolution in the initial picture. The first reconstructed region is used as a reference for prediction in encoding another region or regions of the first picture and/or a second picture.

According to an embodiment, said forming of the first reconstructed region is performed on block basis (e.g. on CTU basis as defined for HEVC, or alike) or on a block row basis (e.g. on a CTU row basis as defined for HEVC, or alike).

According to an embodiment, at least one region within an initial picture is downsampled prior to encoding and forms a first region within a first picture, i.e. a picture to be encoded. As a part of the encoding, at least a first preliminary reconstructed region is reconstructed from the first region. A first reconstructed region is formed by upsampling the first preliminary reconstructed region back to its original resolution (i.e., the resolution of the at least one region). In this case the upsampled samples may be placed in their original position in the initial picture and used as such as input for potential remaining encoding or post-processing operations or as reference for coding units coded later during the encoding process. As the effective encoding takes place at a downsampled domain the encoding methods can be adjusted accordingly. For example, the sample buffers used for intra prediction may be subsampled using the same sampling ratio that is used for the downsampling of the input sample buffer of the at least one region. For example, when said forming of the first reconstructed region is performed on block row basis for a first block row, and a second block row (below and adjacent to the first block row) of the first region uses intra prediction from above, the bottom sample row of the first block row of the first reconstructed region may be subsampled to form intra prediction reference samples for the second block row.

According to an embodiment, a decoder determines the applied sampling ratio for a region, decodes initial samples based on said sampling ratio, resamples the initial samples to the resolution of an output image and stores the resampled data to a decoded picture buffer for potential remaining decoding or post-processing operations or as reference for coding units decoded later during the decoding process. As the effective decoding takes place at a resampled domain the decoding methods can be adjusted accordingly. For example, the sample buffers used for intra prediction may be resampled based the determined sampling ratio for the region. For example, when said forming of the first reconstructed region is performed on block row basis for a first block row, and a second block row (below and adjacent to the first block row) of the first region uses intra prediction from above, the bottom sample row of the first block row of the first reconstructed region may be subsampled to form intra prediction reference samples for the second block row.

According to an embodiment, said forming of the first reconstructed region is performed before encoding or decoding another region or regions of the first picture and the first reconstructed region is used for prediction said another region or regions and/or for filtering (e.g. deblocking filtering, SAO, and/or ALF) said another region or regions.

According to an embodiment, an initial picture comprises a plurality of regions. The first picture is formed from the initial picture, such as an equirectangular panorama picture. The first picture may include a first region that is not resampled and/or rearranged; for example a middle stripe (e.g. midmost 90 degrees field of view) of an equirectangular panorama might not be downsampled. The first picture is formed by resampling and/or rearranging at least a second initial region of the plurality of regions into a second region. For example, a bottom stripe (e.g. 45 degrees vertical field of view) of an equirectangular panorama may be horizontally downsampled. The first region is encoded, wherein said encoding comprises reconstructing a first preliminary reconstructed region corresponding to the first region. A first reconstructed region is formed from the first preliminary reconstructed region by resampling and/or rearranging the first preliminary reconstructed region. For example, the reconstructed middle stripe of the equirectangular panorama may be horizontally downsampled to match the resolution of the second region. The first reconstructed region is used as a reference for prediction in encoding another region or regions of the first picture and/or a second picture. For example, the first reconstructed region may be used as a reference for intra prediction of the second region. Continuing the example above, the downsampled middle stripe of the equirectangular panorama may be used as a reference for prediction for the bottom stripe that was downsampled prior to encoding.

According to an embodiment, an encoder indicates in a bitstream and/or a decoder decodes from a bitstream whether the first preliminary reconstructed region or the first reconstructed region is used in intra prediction for subsequent region(s) of the same picture. In an embodiment, an encoder and/or a decoder concludes based on indicated and/or concluded sampling ratios of regions whether the first preliminary reconstructed region or the first reconstructed region is used in intra prediction for subsequent region(s) of the same picture.

According to an embodiment, said forming of the first reconstructed region is performed after encoding or decoding the first picture.

According to an embodiment, the encoding method further comprises encoding the plurality of regions excluding the first region, and said encoding comprises reconstructing other reconstructed region(s) corresponding to the plurality of regions excluding the first region. In an embodiment, the encoding method further comprises forming a preliminary reconstructed picture from the first preliminary reconstructed region and the other reconstructed region(s). In an embodiment, the encoding method further comprises forming a first reconstructed picture from the first reconstructed region and the other reconstructed region(s).

According to an embodiment, the encoding method further comprises decoding, from the bitstream, other encoded region(s) of a first picture into other reconstructed region(s), the other encoded region(s) excluding the first encoded region. In an embodiment, the decoding method further comprises forming a preliminary reconstructed picture from the first preliminary reconstructed region and the other reconstructed region(s). In an embodiment, the decoding method further comprises forming a first reconstructed picture from the first reconstructed region and the other reconstructed region(s).

The above embodiments may be utilized in encoding/decoding methods where the first picture is encoded/decoded according to an intra picture encoding/decoding method, and the first reconstructed region (or the first reconstructed picture enclosing the first reconstructed region) and/or the first preliminary reconstructed region (or the preliminary reconstructed picture enclosing the first preliminary reconstructed region) may be used as a reference for prediction for one or more subsequent pictures encoded/decoded according to an inter picture encoding/decoding method.

Figure 15A:
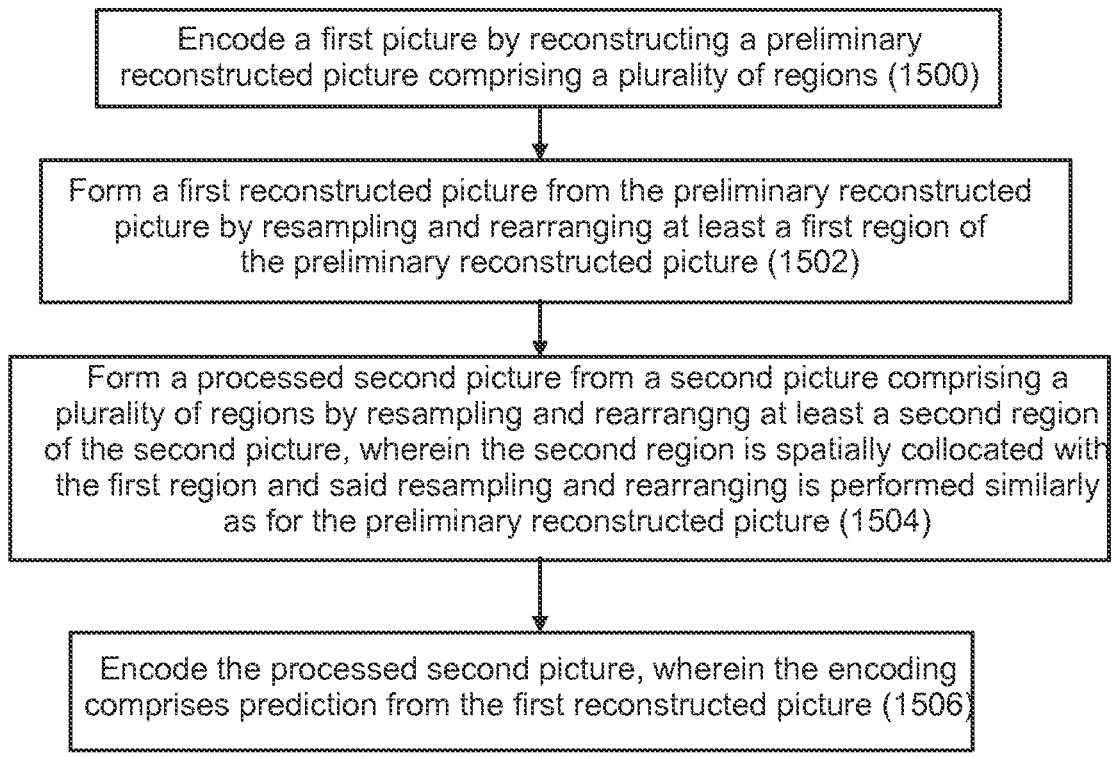
FIG. 15a shows a flow chart of an encoding method involving regional resampling in accordance with an embodiment.

According to an embodiment, which is disclosed in FIG. 15a as a flow diagram, a first picture is encoded (1500), wherein the encoding comprises reconstructing a preliminary reconstructed picture comprising a plurality of regions, each region covering a subset of the preliminary reconstructed picture. A first reconstructed picture is formed (1502) from the preliminary reconstructed picture, wherein the forming comprises resampling and/or rearranging at least a first region of the preliminary reconstructed picture, wherein rearranging comprises relocating, rotating, and/or mirroring. A processed second picture is formed (1504) from a second picture comprising a plurality of regions, each region covering a subset of the second picture, wherein the forming comprises resampling and/or rearranging at least a second region of the second picture, wherein the at least second region is spatially collocated with the at least first region and said resampling and/or rearranging is performed similarly as for the preliminary reconstructed picture. The processed second picture is encoded (1506), wherein the encoding comprises prediction from the first reconstructed picture.

Figure 15B:
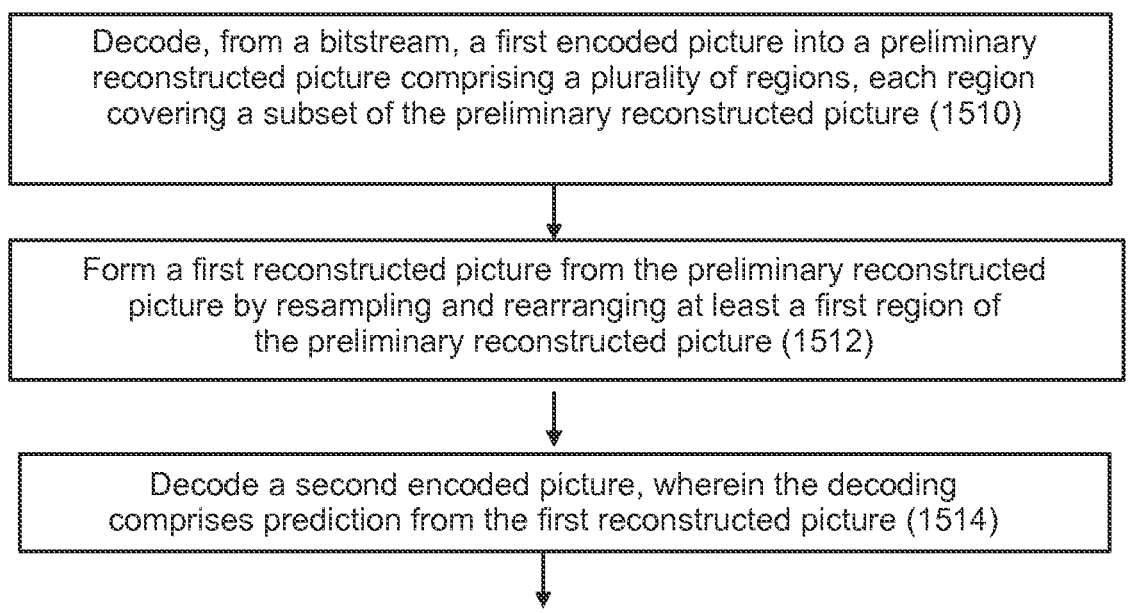
FIG. 15b shows a flow chart of a decoding method involving regional resampling according to an embodiment of the invention.

Correspondingly, in a decoding method, which is disclosed in FIG. 15b as a flow diagram in accordance with an embodiment, a first encoded picture is decoded (1510) into a preliminary reconstructed picture comprising a plurality of regions, each region covering a subset of the preliminary reconstructed picture. A first reconstructed picture is formed (1512) from the preliminary reconstructed picture, wherein the forming comprises resampling and/or rearranging at least a first region of the preliminary reconstructed picture, wherein rearranging comprises relocating, rotating, and/or mirroring; and a second encoded picture is decoded (1514), wherein the decoding comprises prediction from the first reconstructed picture.

Thus, picture regions of an equirectangular panorama close to the nadir and zenith are resampled and rearranged as region-wise for a picture as a part of decoding or reconstructing the picture. The resampled/rearranged picture is inserted into the decoded picture buffer and can be used as a reference picture for predicting subsequent pictures in decoding order. Thus, some part of pictures are regionally downsampled prior to encoding, and hence the resampling and/or rearranging are parts of the decoding/reconstructing process. The resampling of a picture is performed when decoding the picture, and the samples of the region are rearranged within a decoded picture.

According to an embodiment, the preliminary reconstructed picture is obtained by encoding the first picture in accordance with an intra picture encoding method (in the encoding phase) and by decoding the first encoded picture in accordance with an intra picture decoding method (in the decoding phase).

According to an embodiment, said at least first region and/or said at least second region comprises at least one of the following:
 a top region of a vertical field of view of the preliminary reconstructed picture;
 a bottom region of a vertical field of view of the preliminary reconstructed picture.

According to an embodiment, the preliminary reconstructed picture comprises at least one top region of the vertical field of view, a middle region of the vertical field of view, and at least one bottom region of the vertical field of view.

According to an embodiment, the at least one top region of the vertical field of view and the at least one bottom region of the vertical field of view are downsampled and packed into a frame with the middle region of the vertical field of view.

The embodiments relating to the encoding method can be further illustrated by referring to FIG. 8, where an uncompressed picture $U_0$ (i.e. the first picture; 850) is encoded first as an intra-coded picture. For example, a conventional intra picture encoding process 852 can be used. As a part of the encoding, a preliminary reconstructed picture 854 is formed. A regional resampling process 856 may then be applied to selected regions (herein also referred to as stripes) of the preliminary reconstructed picture. In the example of FIG. 8, the top and bottom stripes of the panoramic picture may each comprise, for example, 45 degrees vertical field of view, and they may be horizontally downsampled to half of the width. The regional resampling may be combined with or followed by rearranging the resampled regions and the unmodified regions so that these regions are packed into a frame of the reconstructed picture $R_0$ 858. Different arrangements of the regions may be used. The resulting reconstructed picture $R_0$ may be stored in the decoded picture buffer (DPB; 860).

An uncompressed picture $U_n$ (n>0, where n indicates the (de)coding order of pictures), i.e. the second picture 862, is regionally resampled and the regions are rearranged. The resampling and rearranging process 864 may be the same as or similar to the respective process 856 performed to the preliminary reconstructed picture. The output of the regional resampling and rearranging process 864 is a processed uncompressed picture $V_n$ 866. Picture V, is coded as an inter-coded picture. For example, a conventional inter picture encoding process 868 can be used where at least one reference picture that is or may be used as a reference for prediction is picture $R_0$ 858. As a part of the encoding, a reconstructed picture $R_n$ 870 is formed and may be included in the decoded picture buffer 860.

The embodiments relating to the decoding method can be further illustrated by referring to FIG. 9, where a bitstream comprising coded pictures is obtained as input. When a coded picture is an intra-coded picture, a conventional intra picture decoding process 900 is used, for example, resulting into a preliminary reconstructed picture 902. As in the encoder, a regional resampling process 904 is applied and may be combined with or followed by a rearranging process of rearranging the regions. The resulting picture is the reconstructed picture $R_0$ 906 that is included in the decoded picture buffer (DPB; 908).

When a coded picture is an inter-coded picture, a conventional inter picture decoding process 908 is used, for example, where at least one reference picture that is or may be used as a reference for prediction is picture $R_0$ 906. The decoding results into a reconstructed picture $R_n$ 912, which may be included in the decoded picture buffer 908.

In an embodiment, the uncompressed picture $U_n$ (n>0) or the initial picture (in different embodiments) is partitioned into a plurality of regions that are non-overlapping and that collectively form the uncompressed picture $U_n$ or the initial picture, respectively.

In an embodiment, the uncompressed picture $U_n$ (n>0) or the initial picture is partitioned into a plurality of regions that may be overlapping. Overlapping regions may help in avoiding visible boundaries between regions.

In an embodiment, regions of the processed uncompressed picture $V_n$ (n>0) or the first picture (in different embodiments) are packed into the frame tightly in a manner that a boundary of one region is adjacent to a boundary of another region. Examples of tight packing are provided in FIGS. 11a to 11c.

Figure 10A:
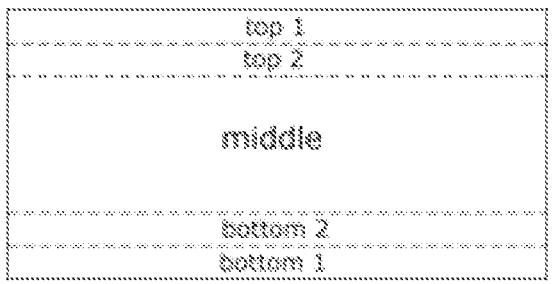
FIGS. 10a, 10b, 10c, 10d show examples of partitioning a picture into a plurality of stripes in accordance with various embodiments.
Figure 10B:
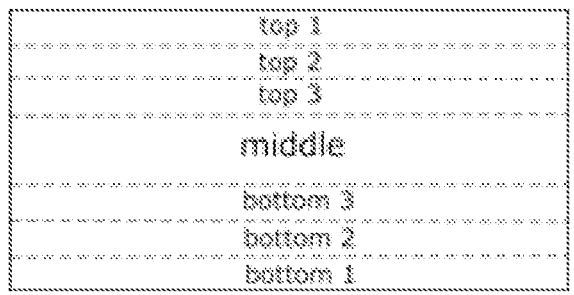
Figure 10C:
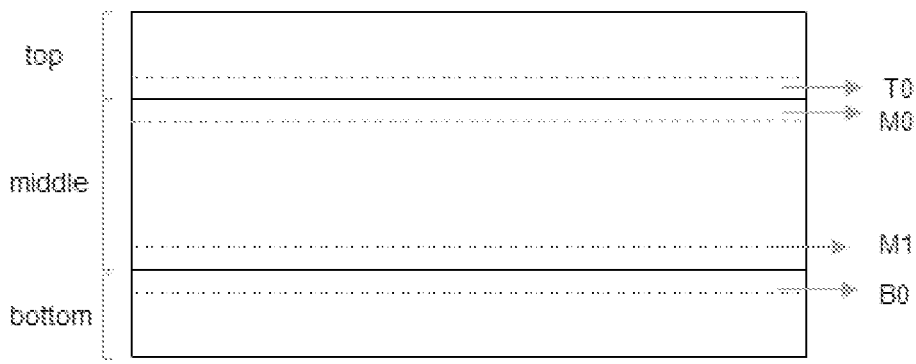

In an embodiment, regions of the processed uncompressed picture $V_n$ (n>0) or the first picture (in different embodiments) may comprise one or more redundant block columns and/or rows that are not needed to form a picture for displaying or an output picture from the decoding process. Redundant block columns and/or rows may be present to improve rate-distortion performance for motion vectors that cause references outside a region boundary. Redundant block columns and/or rows may be arranged to contain boundary extensions of the corresponding effective region. When regions are stripes, e.g. as described in FIGS. 10a to 10c, redundant block rows may be referred to as redundant sub-stripes. Embodiments for handling of redundant block columns and/or rows are described next.

An effective picture area may be defined as the picture area or the set of samples or sample locations within a decoded picture that contains decoded samples useful for displaying. Areas outside the effective picture area might not be useful for displaying but may be present e.g. for making the picture width or height to match the block grid used in coding.

In accordance with an embodiment, the encoder may decide to arrange the uncompressed pictures prior to encoding to contain block row(s) and/or block column(s) intended for boundary extensions or include block row(s) and/or block column(s) for boundary extensions into coded pictures during encoding. In accordance with an embodiment, the boundary extension is formed by intra prediction, intra-block-copy prediction, or inter prediction, as explained in details further below. In accordance with another embodiment, the boundary extension is formed by reference frame padding, as explained in details further below.

Correspondingly, a decoder may receive one or more encoded pictures for decoding. In accordance with an embodiment, the decoder decodes the pictures to obtain reconstructed frame(s) and perform frame padding to fill in areas outside an effective picture area to produce a padded reference picture, if needed. Reference frame padding may be performed in connection with resampling and/or rearrangement as described in other embodiments.

In an embodiment, a block column extending a constituent frame partition to the right is encoded with horizontal intra prediction. In an embodiment, an encoder may choose to encode the boundary extension without prediction error coding. In another embodiment, an encoder always encodes the boundary extension without prediction error coding.

In an embodiment, a block row extending a constituent frame partition to below is encoded with vertical intra prediction. An encoder may choose to encode the boundary extension without prediction error coding. In another embodiment, an encoder always encodes the boundary extension without prediction error coding.

In an embodiment, an encoder indicates in the bitstream the prediction error coding blocks to be absent or to contain zero-valued prediction error. In an embodiment, an encoder infers that no prediction error is included for the boundary extension and omit coding any prediction error related syntax elements for the boundary extension into the bitstream. In an embodiment, a decoder concludes which blocks belong to a boundary extension and omits decoding of any prediction error related syntax elements for the boundary extension from the bitstream.

In an embodiment, resampling of a region is performed region-wise or using smaller units than a region (e.g. CTU rows within a region), prior to encoding or decoding a subsequent region in (de)coding order. In an embodiment, a block row or column extending a second constituent frame partition is encoded with intra-block-copy prediction from a first constituent frame partition (of the same picture) that has been resampled to the sampling ratio of the second constituent frame partition prior to encoding or decoding the second constituent frame partition. In an example with reference to FIG. 11d, the redundant block row T0 is intra-block-copy predicted from the bottom of the top stripe (resampled to the sampling ratio of the middle stripe), and the redundant block row B0 is intra-block-copy predicted from the top row of the bottom stripe (resampled to the sampling ratio of the middle stripe).

In an embodiment, a block in a boundary extension is inter predicted. This can be effective when the movement is such that the previous picture(s), in decoding order, contain suitable samples for the boundary extension, e.g. when the boundary extension of a previous picture can also serve as the boundary extension for the current picture.

In an embodiment, an encoder indicates, e.g. in a PPS, a SPS, a VPS, an SEI message or VUI, the effective picture area of a constituent frame partition or a region. In an embodiment, the decoder decodes the indication of the effective picture area of a constituent frame partition or a region.

In an embodiment, the boundary extension blocks are first encoded and reconstructed into an intermediate reference frame conventionally but might contain any sample values. Analogously, the boundary extension blocks are first conventionally decoded into an intermediate reference frame. The boundary extension of the intermediate reference frame is then modified with reference frame padding as follows. In an embodiment, the reconstructed sample value of the boundary sample of the effective picture area may be used to fill in samples in the same sample row within the boundary extension. In another embodiment, a boundary extension block is copied from another reconstructed constituent frame partition. Said copying may be performed after resampling and/or rearranging, as described in other embodiments. In an example with reference to FIG. 11d, the redundant block row "resampled M0" of the constituent frame partition for the resampled top stripe may be copied from the block row M0 of the reconstructed middle stripe, resampled to the sampling ratio of the coded top stripe. Similarly, the redundant block row "resampled M1" of the constituent frame partition for the resampled bottom stripe may be copied from the block row M1 of the reconstructed middle stripe, horizontally mirrored and resampled to the sampling ratio of the coded bottom stripe. The redundant block row "T0" of the constituent frame partition for the middle stripe may be copied from the block row T0 of the top stripe, resampled to the sampling ratio of the middle stripe. Similarly, the redundant block row "B0" of the constituent frame partition for the middle stripe may be copied from the block row B0 of the bottom stripe, mirrored horizontally and resampled to the sample ratio of the middle stripe.

Figure 10D:
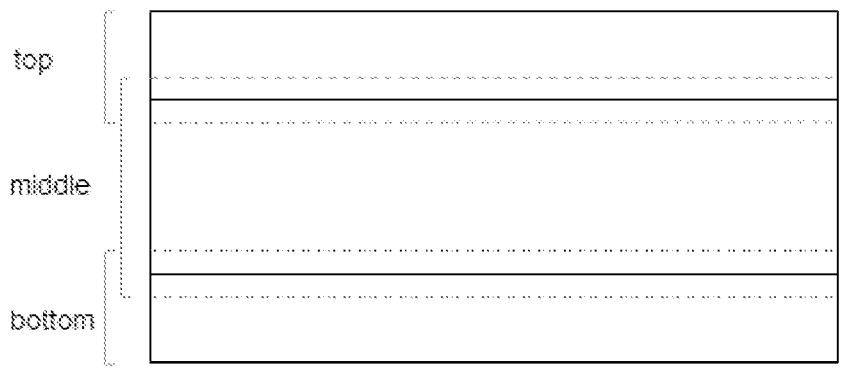

In an embodiment, intra-block-copy prediction is used by an encoder for a block where a first region and a second region are overlapping. If the first region and the second region have different sampling ratio compared to each other or if they have been arranged differently through rotation and/or mirroring, one or both of them may be resampled and/or rearranged prior to intra-block-copy prediction in encoding and/or decoding. In an example with reference to FIG. 10d, a block in the top row of the middle stripe may be encoded using intra-block-copy prediction from the top stripe. If the top stripe was resampled prior to encoding, e.g. as illustrated in FIG. 11e, it is resampled to the resolution of the middle stripe prior to intra-block-copy prediction.

In the previous embodiments, partitioning the picture into three stripes, i.e. top, middle and bottom, has been used as an example. However, the applicable partitioning is not limited to three stripes, but for example, the following regions shown in FIGS. 10a, 10b, 10c and 10d may be used instead:

Five stripes: herein, the first top and bottom stripes (top1, bottom1) may be downsampled to ¼ of the original width, and the second stripes of top and bottom (top2, bottom2) may be downsampled to ¾ of the original width.

Seven stripes: herein, the first top and bottom stripes (top1, bottom1) may be downsampled to ¼ of the original width, the second stripes of top and bottom (top2, bottom2) may be to ½ of the original width, and the third stripes of top and bottom (top3, bottom3) may be downsampled to ¾ of the original width.

Multiple stripes with redundant sub-stripes: herein, the picture is partitioned into three stripes, i.e. top, middle and bottom as in the previous embodiments, and several redundant sub-stripes are defined inside the stripes, e.g. T0 in top, M0 and M1 in middle, and B0 in bottom.

Overlapped stripes: herein, the picture is partitioned into three overlapping stripes, i.e. top, middle and bottom as in the previous embodiments, and the bottom part of the top stripe and the top part of the middle stripe have shared content (e.g. two CTU rows as defined in HEVC), and the top part of the bottom stripe and the bottom part of the middle stripe have shared content (e.g. two CTU rows as defined in HEVC).

In the previous embodiments, a frame packing arrangement where the downsampled top and bottom stripes have been rearranged above the middle stripe e.g. as illustrated in FIGS. 8 and 9 has been used as an example. However, the applicable frame packing is not limited to the above-mentioned arrangement, but for example, the following frame packing arrangements shown in FIGS. 11*a*, 11*b*, 11*c*, 11*d* and 11*e* may be used instead.

Figure 11A:
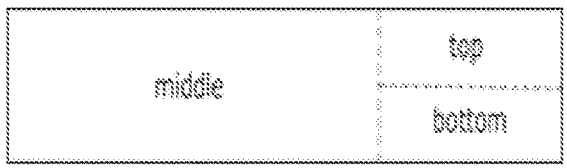
FIGS. 11a, 11b, 11c, 11d, 11e show examples of frame packing stripes into a frame in accordance with various embodiments.

FIG. 11*a* shows an alternative frame packing arrangement for three stripes, where the downsampled top and bottom stripes have been rearranged as vertically successive regions, both being parallel to the middle stripe. FIG. 11*a* shows an example where the downsampled top and bottom strips are on the right of the middle stripe. It needs to be understood that the downsampled top and bottom strips may alternatively be located on the left of the middle stripe.

Figure 11B:
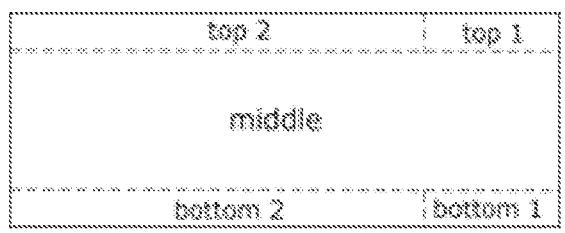

FIG. 11*b* shows an example for a frame packing arrangement for five stripes, where the top2 stripe, downsampled to ¾ of the original width, and the top 1 stripe, downsampled to ¼ of the original width, have been rearranged parallel above the middle stripe. Similarly, the bottom2 stripe, downsampled to ¾ of the original width, and the bottom1 stripe, downsampled to ¼ of the original width, have been rearranged parallel below the middle stripe.

Figure 11C:
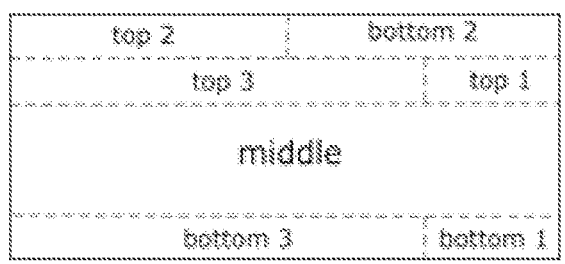

FIG. 11*c* shows an example for a frame packing arrangement for seven stripes, where the top3 stripe, downsampled to ¾ of the original width, and the top1 stripe, downsampled to ¼ of the original width, have been rearranged parallel above the middle stripe. Similarly, the bottom3 stripe, downsampled to ¾ of the original width, and the bottom1 stripe, downsampled to ¼ of the original width, have been rearranged parallel below the middle stripe. Moreover, the top2 and the bottom2 stripes, both downsampled to ½ of the original width, have been rearranged parallel above the top3 and the top1 stripes.

Figure 11D:
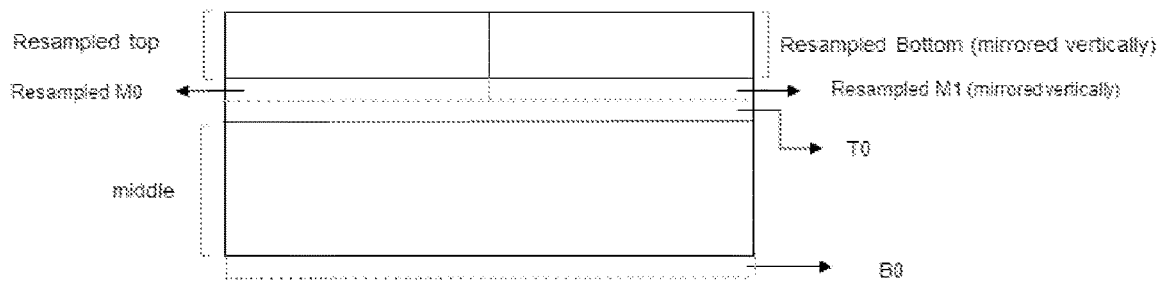
Figure 11E:
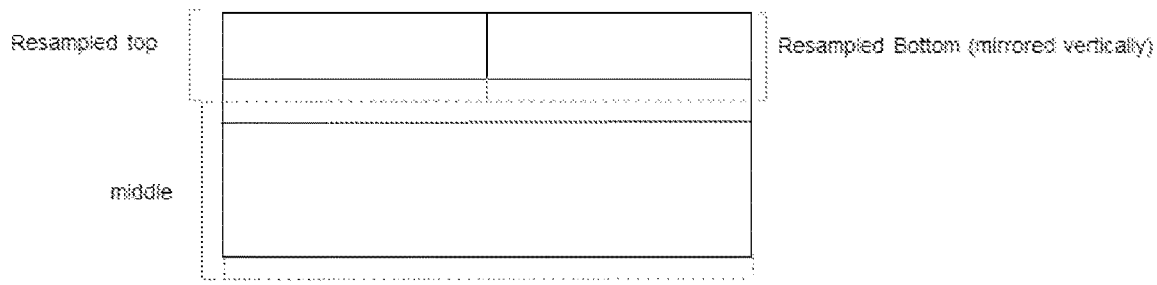

FIG. 11*d* shows an example for more than one operation for a stripe or sub-stripe, where the top stripe, downsampled to ½ of the original width, and the bottom stripe, downsampled to ½ of the original width and mirrored vertically, have been rearranged parallel. Then, the M0 sub-stripe, downsampled to ½ of the original width, and the M1 sub-stripe, downsampled to ½ of the original width and mirrored vertically, have been rearranged parallel. Then, T0 and B0 sub-stripes are located in the above and below of the middle stripe respectively. In this case, the process 864 may exclude processing sub-stripes, so it may be different than the respective process 856.

FIG. 11*e* shows an example for overlapped stripes, where the top stripe, downsampled to ½ of the original width, and the bottom stripe, downsampled to ½ of the original width and mirrored vertically, have been rearranged parallel above the middle stripe. In this case, the process 864 may exclude processing the overlapped parts twice. For example, it may process half of the overlapped part as a part of one stripe, and the other half of the overlapped part as a part of the other stripe. So it may be different than the respective process 856.

A skilled person appreciates that the downsampled stripes may be rearranged in various other frame packing arrangements.

According to an embodiment, an encoder may indicate in the bitstream, e.g. in a picture parameter set or a sequence parameter set, and/or a decoder may decode from the bitstream one or more of the following:

the preliminary reconstructed picture represents an original picture without regional downsampling and/or rearranging; e.g., the preliminary reconstructed picture represents an equirectangular panorama picture the preliminary reconstructed picture represents a regionally downsampled and/or rearranged picture, e.g. such as depicted in FIGS. 11*a* to 11*e*

According to an embodiment, an encoder may indicate in the bitstream, e.g. in a picture parameter set or a sequence parameter set, one or more of the following:

location and size of regions within the preliminary reconstructed picture rearranging instructions, including one or both of resampling ratio(s) (e.g. horizontal and vertical) for selected regions and locations of regions (after resampling, if that is applied)

location and size of regions within the reconstructed picture

According to an embodiment, a decoder decodes from the bitstream one or more of the above indications. From the decoded indications, the decoder may conclude the parameters for the regional resampling and/or rearranging process to be applied.

According to an embodiment, a region is encoded as one or more complete slice segments, not containing coded data from other regions. According to an embodiment, a region is encoded as one or more complete slices, not containing coded data from other regions. According to another embodiment, a region is coded as a tile or a tile set, not containing coded data from other regions.

According to an embodiment, an encoder may indicate in the bitstream, e.g. in a slice header, or per tile or tile set basis, or for each CTU line or alike (e.g. within a particular tile), one or more of the following:

resampling ratio(s) for the slice, tile, tile set, or CTU line to be applied in the resampling process, or size of the slice, tile, r tile set, or CTU line within the reconstructed picture (of an intra picture)

location for the slice, tile, tile set, or CTU line (after resampling, if that is applied) within the reconstructed picture (of an intra picture)

For a CTU line based indication, the CTU syntax may conditionally contain syntax elements for the above-mentioned information for the first CTU of the CTU row (e.g. within a particular tile).

According to an embodiment, a decoder decodes from the bitstream one or more of the above indications. From the decoded indications, the decoder may conclude the parameters for the regional resampling and/or rearranging process to be applied.

According to an embodiment, both the preliminary reconstructed picture and the reconstructed picture $R_0$ are included in the decoded picture buffer, as determined by an encoder or by default (e.g. as specified in a coding standard). When determined by an encoder, the encoder may indicate in the bitstream, e.g. in a slice header and/or a picture parameter set, which one(s) of the preliminary reconstructed picture and the reconstructed picture $R_0$ are included in the decoded picture buffer.

According to an embodiment, an encoder may indicate in the bitstream, e.g. in a picture parameter set or a sequence parameter set, and/or a decoder may decode from the bitstream, and/or and encoder or a decoder may conclude e.g. based on a constraint of the coding scheme or coding standard one or more of the following:

The preliminary reconstructed picture resulting from the decoding of the first picture is regionally resampled and/or rearranged into the reconstructed picture that is stored in the decoded picture buffer.

Both the preliminary reconstructed picture and the corresponding first reconstructed picture are stored in the decoded picture buffer.

A picture in its original format (without regional downsampling and rearranging, e.g. in an equirectangular panorama format) is stored in the decoded picture buffer using a sampling ratio among the sampling ratios used in the plurality of regions of the first picture. One or more sampling ratio(s) to be used in the pictures stored in the decoded picture buffer may be indicated by an encoder in the bitstream and/or decoded by a decoder from the bitstream and/or pre-defined e.g. in a coding standard and/or concluded. For example, it may be pre-defined that a picture is formed and stored in the decoded picture buffer for each sampling ratio represented by the first picture. For example, if the first picture is formed as illustrated in FIG. 11a, one reconstructed picture may be formed to be stored in the decoded picture buffer for the sampling ratio of the middle stripe, by upsampling the top and bottom stripes, rearranging the upsampled top stripe above the middle stripe, and rearranging the upsampled bottom strip below the middle stripe. Continuing the same example, another reconstructed picture may be formed to be stored in the decoded picture buffer for the sampling ratio of the top and bottom stripes, by downsampling the middle stripe, rearranging the top stripe above the downsampled middle stripe, and rearranging the bottom stripe below the downsampled middle stripe.

It needs to be understood that while some embodiments have been described with reference to the first picture and/or the first reconstructed picture and/or the preliminary reconstructed picture, indications or inference in these embodiments may generally apply to certain pictures. In an embodiment, indications as specified in other embodiments are included in a picture-specific syntax structure, such as a picture parameter set, and apply to the picture(s) for which the syntax structure is indicated or specified to apply. In an embodiment, indications as specified in other embodiments apply to certain type(s) of pictures or pictures with certain characteristics, such as all intra-coded pictures or all pictures with a certain NAL unit type or alike. The types and/or characteristics of pictures to which the indications as specified in other embodiments apply may be pre-defined e.g. in a coding standard or may be indicated by an encoder in the bitstream and/or decoded by a decoder from the bitstream.

According to an embodiment, an encoder determines and indicates sampling ratios (each including horizontal and/or vertical sampling ratio) used in a picture sequence, e.g. in a sequence parameter set. Each picture in the picture sequence is reconstructed for each indicated sampling ratio and stored in the decoded picture buffer. A sampling ratio for a region to be encoded is obtained or concluded. A reference picture is determined for the region so that it has the same sampling ratio as the sampling ratio of the region. The reference picture for the region is indicated in the bitstream.

According to an embodiment, a decoder decodes sampling ratios (each including horizontal and/or vertical sampling ratio) used in a picture sequence, e.g. from a sequence parameter set. Each picture in the picture sequence is reconstructed for each indicated sampling ratio and stored in the decoded picture buffer. The decoder determines the applied sampling ratio for a region. The decoder decodes from an indication of the reference picture for the region. For example, the decoder may obtain a picture order count of the reference picture as said indication. The decoder selects at least one reference frame buffer for motion compensation based on said sampling ratio among the reference pictures having the same indication, e.g. the same picture order count value.

It needs to be understood that instead of or in addition to sampling ratios, embodiments can be similarly realized by other means indicating the sampling grids or densities of different regions of pictures of a picture sequence. For example, it may be indicated by an encoder in a bitstream and/or decoded by a decoder from the bitstream and/or pre-defined e.g. in a coding standard, that only horizontal resampling is in use and that regions represent stripes that span across the entire original picture, and consequently the region widths in terms of samples (e.g. luma samples) may be indicated in a bitstream by an encoder and/or decoded from the bitstream by a decoder.

According to an embodiment, a decoder stores decoded sample values to at least first and second reference picture buffers. Decoder operating according to this embodiment stores the decoded sample values to the first reference picture buffer at the native resolution of the decoding process and uses a different resolution when storing samples to the second reference picture buffer.

According to an embodiment, an encoder and/or a decoder maintains for each reference picture in the decoded picture buffer the information of the regions and their sampling and rearrangement relative to the original pictures. For example, the encoder and/or the decoder may maintain information for a reference picture that it represents a picture without regional downsampling and/or rearranging; e.g., an equirectangular panorama picture. In another example, the encoder and/or the decoder may maintain information (e.g. the location and spatial extents) of the constituent frame partitions, each enclosing a region, and the sampling ratios of the regions. In an embodiment, the encoder and/or the decoder constraints the inter prediction in a manner that the reference pictures are required to have the same the information of the regions and their sampling and rearrangement relative to the original pictures as the picture being encoded or decoded. In an embodiment, said constraining is performed by excluding those reference pictures from the initial reference picture list that have a different information set of the regions and their sampling and rearrangement compared to that in the picture being encoded or decoded, i.e. by including only those reference pictures into the initial reference picture list that have the same information set of the regions and their sampling and rearrangement compared to that in the picture being encoded or decoded.

According to an embodiment, the reconstructed picture $R_n$ (n>0) is regionally resampled and/or rearranged as a part of; or connected with, the output process from the decoding, as determined by an encoder or by default (e.g. as specified in a coding standard). When determined by an encoder, the encoder may indicate in the bitstream, e.g. in a slice header and/or a picture parameter set and/or a sequence parameter set, if the reconstructed picture $R_n$ (n>0) is regionally resampled and/or rearranged. The regional resampling and/or rearranging may result into a picture that has the same representation format as the uncompressed pictures being encoded and the preliminary reconstructed picture, such as equirectangular panorama format. The regional resampling and/or rearranged may be included as part of the process of output cropping as in HEVC or alike.

In an embodiment, the decoder decodes from the bitstream or concludes that constituent frame partitions or regions comprise redundant block columns or rows. Accordingly, the decoder crops the decoded pictures to exclude the areas outside the effective picture area as a part of the output cropping process applied to decoded pictures before they are output by the decoder. The cropping may be performed together with the regional resampling and/or rearranging that is part of the output cropping as described in the previous paragraph.

In an embodiment, the decoder outputs the decoded indications of the constituent frame partitions or regions and their effective picture areas (at least if they contain redundant block columns or rows). In an embodiment, the decoder or the displaying process uses only the effective picture area of the constituent frame partitions or regions in the displaying process, excluding redundant block columns and rows (a.k.a. boundary extension(s)) from the displaying process.

According to an embodiment, an encoder selects a quantization parameter for prediction error coding based on the resampling information.

According to an embodiment, rather than forming a first reconstructed picture from the preliminary reconstructed picture, motion compensated prediction is performed either by subsampling the reference sample blocks of the preliminary reconstructed picture or by adjusting the step size of the interpolation filter used in motion compensation process when accessing the preliminary reconstructed picture.

Figure 12:
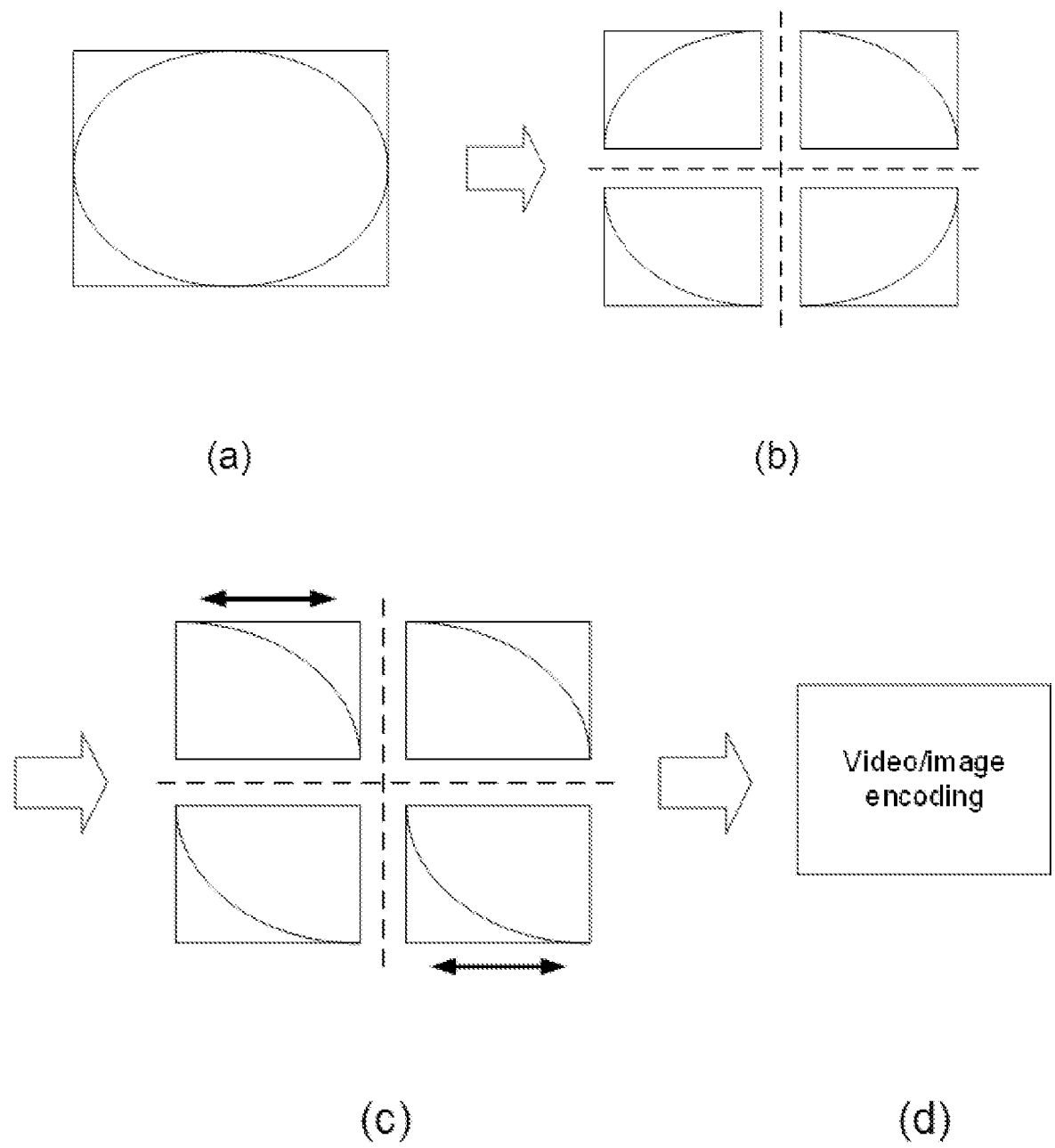
FIG. 12 shows an example of partitioning a fisheye picture in accordance with various embodiments.

In an embodiment, the initial picture comprises a picture with a symmetric non-rectangular effective picture area, such as a circular or oval effective picture area, such as a fisheye picture. The first picture is formed from the initial picture by splitting the initial picture into four quadrants, each forming a region. One or more of the regions is rearranged by relocating, rotating, and/or mirroring. The rearranging may be selected to make intra prediction more optimal e.g. by having a greater number of reference samples (of the effective picture area) available for directional intra prediction after the rearranging. In an example given in FIG. 12, the initial picture shown in step (a) is divided into four regions, as shown in (b). The bottom-right region is flipped horizontally, as shown in (c), e.g. to have a greater number of reference samples within the effective picture area to be available for directional intra prediction in subsequent encoding steps (d). In an embodiment, the encoding and decoding process for intra prediction is modified to take the rearrangements into account by performing corresponding rotating and/or mirroring for the reference region whenever intra prediction is applied across region boundaries. For example, in the example given in FIG. 12, vertical reference samples for spatial intra prediction process for the top boundary of the bottom-right region can be obtained by extracting the bottom row of the top-right partition and flipping that row horizontally. As another example using the partitioning and transformations of FIG. 12, the horizontal reference samples of the left boundary of top-right partition can be obtained by extracting the leftmost sample column of the top-left partition. More generally, the spatial sample prediction process or the spatial syntax element prediction processes can be performed based on the transformation of different partitions. The embodiments described in this paragraph may be applied with inter picture encoding where the fisheye pictures are encoded as such, without rearranging them. It needs to be understood that while this paragraph and FIG. 12 provided examples with reference to fisheye pictures, the embodiments equally apply to any pictures with circular or oval picture area. For example, the examples can be applied for panorama pictures of a pseudo-cylindrical projection type, such as a Tobler hyperelliptical projection, Mollweide projection, or an uninterrupted sinusoidal pseudo-cylindrical projection.

It needs to be understood that while embodiments have been described with reference to intra picture(s) and inter picture(s), another categorization of pictures may be used instead to realize embodiments. For example, instead of intra picture(s) and inter picture(s), embodiments can be realized with reference to IRAP picture(s) and non-IRAP picture(s), respectively. In another example, instead of intra picture(s) and inter picture(s), embodiments can be realized with reference to picture(s) at temporal sub-layers 0 to N, inclusive, and picture(s) at temporal sub-layers greater than N, respectively. In yet another example, an encoder indicates, e.g. on picture basis (e.g. in a slice header and/or a picture parameter set associated with a picture), one or both of the following:

regional resampling and/or rearranging is applied to the preliminary reconstructed picture resulting from a conventional encoding/decoding process if the picture uses, buffer as a reference for prediction, a preliminary reconstructed picture included in the decoded picture or a reconstructed picture included in the decoded picture buffer The above embodiments improve compression performance compared to constant regional downsampling. Constant regional downsampling results low quality in intra pictures and hence affects the inter-frame prediction. There are embodiments that improve the inter-frame prediction by coding the intra pictures in high resolution alongside with regionally downsampling the inter pictures which reduces the redundant samples in nadir and zenith areas of equirectangular panoramas.

Figure 13:
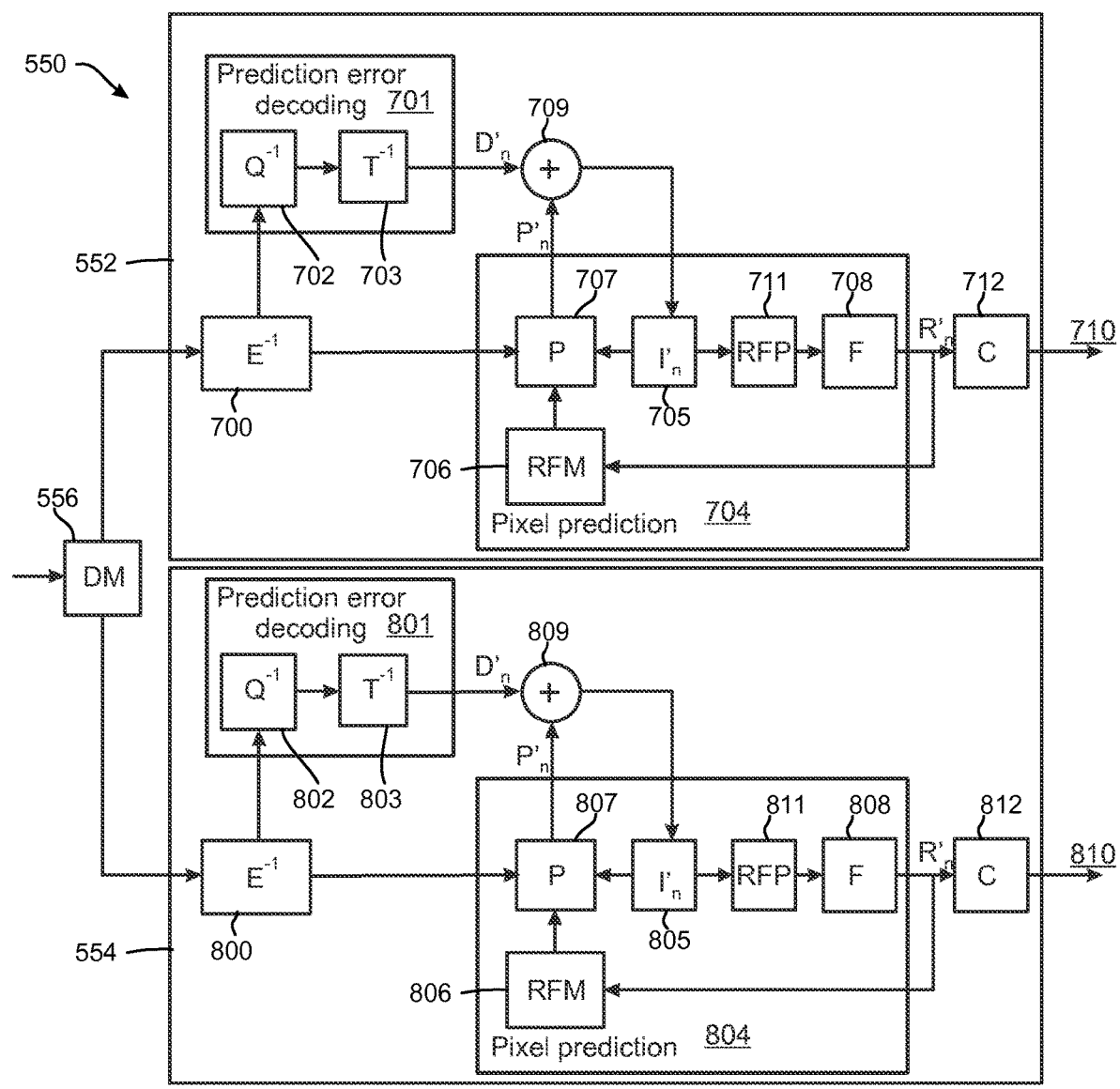
FIG. 13 shows a schematic diagram of a decoder suitable for implementing embodiments of the invention.

FIG. 13 shows a block diagram of a video decoder suitable for employing embodiments of the invention. FIG. 13 depicts a structure of a two-layer decoder, but it would be appreciated that the decoding operations may similarly be employed in a single-layer decoder.

The video decoder 550 comprises a first decoder section 552 for base view components and a second decoder section 554 for non-base view components. Block 556 illustrates a demultiplexer for delivering information regarding base view components to the first decoder section 552 and for delivering information regarding non-base view components to the second decoder section 554. Reference P'n stands for a predicted representation of an image block. Reference D'n stands for a reconstructed prediction error signal. Blocks 704, 804 illustrate preliminary reconstructed images (I'n). Reference R'n stands for a final reconstructed image. Blocks 703, 803 illustrate inverse transform ($T^{-1}$). Blocks 702, 802 illustrate inverse quantization ($Q^{-1}$). Blocks 700, 800 illustrate entropy decoding ($E^{-1}$). Blocks 706, 806 illustrate a reference frame memory (RFM). Blocks 707, 807 illustrate prediction (P) (either inter prediction or intra prediction). Blocks 708, 808 illustrate filtering (F). Blocks 709, 809 may be used to combine decoded prediction error information with predicted base view/non-base view components to obtain the preliminary reconstructed images (I'n). Preliminary reconstructed and filtered base view images may be output 710 from the first decoder section 552 and preliminary reconstructed and filtered base view images may be output 810 from the second decoder section 554.

Herein, the decoder should be interpreted to cover any operational unit capable to carry out the decoding operations, such as a player, a receiver, a gateway, a demultiplexer and/or a decoder.

The entropy decoder 700, 800 perform entropy decoding on the received signal. The entropy decoder 700, 800 thus performs the inverse operation to the entropy encoder of the encoder 330, 430 described above. The entropy decoder 700, 800 outputs the results of the entropy decoding to the prediction error decoder 701, 801 and pixel predictor 704, 804.

The pixel predictor 704, 804 receives the output of the entropy decoder 700, 800. The output of the entropy decoder 700, 800 may include an indication on the prediction mode used in encoding the current block. A predictor 707, 807 may perform intra or inter prediction as determined by the indication and output a predicted representation of an image block to a first combiner 709, 809. The predicted representation of the image block is used in conjunction with the reconstructed prediction error signal to generate a preliminary reconstructed image. The preliminary reconstructed image may be used in the predictor or may be passed to a regional reference frame processing unit 711, 811. The regionally resampled and/or rearranged reference image may be passed to a filter 708, 808. The filter 708, 808 may apply a filtering which outputs a final reconstructed signal. The final reconstructed signal may be stored in a reference frame memory 706, 806. The reference frame memory 706, 806 may further be connected to the predictor 707, 807 for prediction operations.

It needs to be understood that the regional reference frame processing unit 711, 811 and the filter 708, 808 may, in some embodiments, be located in opposite order in FIG. 13. It also needs to be understood that in some embodiments parts of the filtering performed by the filter 708, 808 may be performed prior to regional reference frame processing 711, 811, while the remaining parts may be performed after the regional reference frame processing 711, 811. Likewise, some parts of the regional reference frame processing 711, 811 (e.g. resampling) may be performed prior to the filter 708, 808, while the remaining parts of the reference frame processing 711, 811 (e.g. rearranging) may be performed after the filter 708, 808.

In some embodiments, the regional reference frame processing unit 711, 811 may comprise the reference frame padding functionality, as explained earlier. In some embodiments with reference to FIG. 4, the regional reference frame processing unit 315, 415 may comprise the reference frame padding functionality, as explained earlier.

Figure 14:
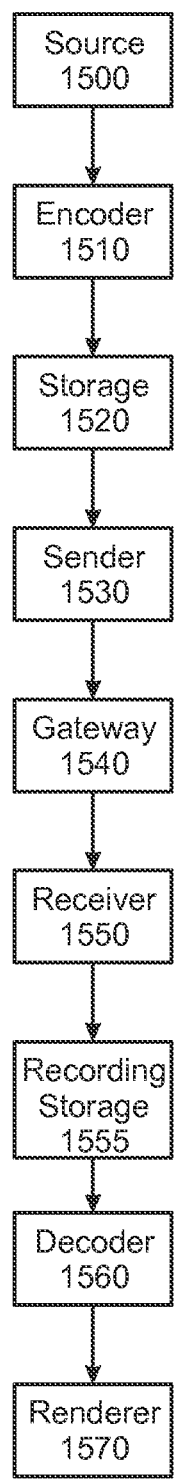
FIG. 14 shows a schematic diagram of an example multimedia communication system within which various embodiments may be implemented.

FIG. 14 is a graphical representation of an example multimedia communication system within which various embodiments may be implemented. A data source 1510 provides a source signal in an analog, uncompressed digital, or compressed digital format, or any combination of these formats. An encoder 1520 may include or be connected with a pre-processing, such as data format conversion and/or filtering of the source signal. The encoder 1520 encodes the source signal into a coded media bitstream. It should be noted that a bitstream to be decoded may be received directly or indirectly from a remote device located within virtually any type of network. Additionally, the bitstream may be received from local hardware or software. The encoder 1520 may be capable of encoding more than one media type, such as audio and video, or more than one encoder 1520 may be required to code different media types of the source signal. The encoder 1520 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the figure only one encoder 1520 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream may be transferred to a storage 1530. The storage 1530 may comprise any type of mass memory to store the coded media bitstream. The format of the coded media bitstream in the storage 1530 may be an elementary self-contained bitstream format, or one or more coded media bitstreams may be encapsulated into a container file, or the coded media bitstream may be encapsulated into a Segment format suitable for DASH (or a similar streaming system) and stored as a sequence of Segments. If one or more media bitstreams are encapsulated in a container file, a file generator (not shown in the figure) may be used to store the one more media bitstreams in the file and create file format metadata, which may also be stored in the file. The encoder 1520 or the storage 1530 may comprise the file generator, or the file generator is operationally attached to either the encoder 1520 or the storage 1530. Some systems operate "live", i.e. omit storage and transfer coded media bitstream from the encoder 1520 directly to the sender 1540. The coded media bitstream may then be transferred to the sender 1540, also referred to as the server, on a need basis. The format used in the transmission may be an elementary self-contained bitstream format, a packet stream format, a Segment format suitable for DASH (or a similar streaming system), or one or more coded media bitstreams may be encapsulated into a container file. The encoder 1520, the storage 1530, and the server 1540 may reside in the same physical device or they may be included in separate devices. The encoder 1520 and server 1540 may operate with live real-time content, in which case the coded media bitstream is typically not stored permanently, but rather buffered for small periods of time in the content encoder 1520 and/or in the server 1540 to smooth out variations in processing delay, transfer delay, and coded media bitrate.

The server 1540 sends the coded media bitstream using a communication protocol stack. The stack may include but is not limited to one or more of Real-Time Transport Protocol (RTP), User Datagram Protocol (UDP), Hypertext Transfer Protocol (HTTP), Transmission Control Protocol (TCP), and Internet Protocol (IP). When the communication protocol stack is packet-oriented, the server 1540 encapsulates the coded media bitstream into packets. For example, when RTP is used, the server 1540 encapsulates the coded media bitstream into RTP packets according to an RTP payload format. Typically, each media type has a dedicated RTP payload format. It should be again noted that a system may contain more than one server 1540, but for the sake of simplicity, the following description only considers one server 1540.

If the media content is encapsulated in a container file for the storage 1530 or for inputting the data to the sender 1540, the sender 1540 may comprise or be operationally attached to a "sending file parser" (not shown in the figure). In particular, if the container file is not transmitted as such but at least one of the contained coded media bitstream is encapsulated for transport over a communication protocol, a sending file parser locates appropriate parts of the coded media bitstream to be conveyed over the communication protocol. The sending file parser may also help in creating the correct format for the communication protocol, such as packet headers and payloads. The multimedia container file may contain encapsulation instructions, such as hint tracks in the ISOBMFF, for encapsulation of the at least one of the contained media bitstream on the communication protocol.

The server 1540 may or may not be connected to a gateway 1550 through a communication network, which may e.g. be a combination of a CDN, the Internet and/or one or more access networks. The gateway may also or alternatively be referred to as a middle-box. For DASH, the gateway may be an edge server (of a CDN) or a web proxy. It is noted that the system may generally comprise any number gateways or alike, but for the sake of simplicity, the following description only considers one gateway 1550. The gateway 1550 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions.

The system includes one or more receivers 1560, typically capable of receiving, de-modulating, and de-capsulating the transmitted signal into a coded media bitstream. The coded media bitstream may be transferred to a recording storage 1570. The recording storage 1570 may comprise any type of mass memory to store the coded media bitstream. The recording storage 1570 may alternatively or additively comprise computation memory, such as random access memory. The format of the coded media bitstream in the recording storage 1570 may be an elementary self-contained bitstream format, or one or more coded media bitstreams may be encapsulated into a container file. If there are multiple coded media bitstreams, such as an audio stream and a video stream, associated with each other, a container file is typically used and the receiver 1560 comprises or is attached to a container file generator producing a container file from input streams. Some systems operate "live," i.e. omit the recording storage 1570 and transfer coded media bitstream from the receiver 1560 directly to the decoder 1580. In some systems, only the most recent part of the recorded stream, e.g., the most recent 10-minute excerption of the recorded stream, is maintained in the recording storage 1570, while any earlier recorded data is discarded from the recording storage 1570.

The coded media bitstream may be transferred from the recording storage 1570 to the decoder 1580. If there are many coded media bitstreams, such as an audio stream and a video stream, associated with each other and encapsulated into a container file or a single media bitstream is encapsulated in a container file e.g. for easier access, a file parser (not shown in the figure) is used to decapsulate each coded media bitstream from the container file. The recording storage 1570 or a decoder 1580 may comprise the file parser, or the file parser is attached to either recording storage 1570 or the decoder 1580. It should also be noted that the system may include many decoders, but here only one decoder 1570 is discussed to simplify the description without a lack of generality The coded media bitstream may be processed further by a decoder 1570, whose output is one or more uncompressed media streams. Finally, a renderer 1590 may reproduce the uncompressed media streams with a loudspeaker or a display, for example. The receiver 1560, recording storage 1570, decoder 1570, and renderer 1590 may reside in the same physical device or they may be included in separate devices.

A sender 1540 and/or a gateway 1550 may be configured to perform switching between different representations e.g. for view switching, bitrate adaptation and/or fast start-up, and/or a sender 1540 and/or a gateway 1550 may be configured to select the transmitted representation(s). Switching between different representations may take place for multiple reasons, such as to respond to requests of the receiver 1560 or prevailing conditions, such as throughput, of the network over which the bitstream is conveyed. A request from the receiver can be, e.g., a request for a Segment or a Subsegment from a different representation than earlier, a request for a change of transmitted scalability layers and/or sub-layers, or a change of a rendering device having different capabilities compared to the previous one. A request for a Segment may be an HTTP GET request. A request for a Subsegment may be an HTTP GET request with a byte range. Additionally or alternatively, bitrate adjustment or bitrate adaptation may be used for example for providing so-called fast start-up in streaming services, where the bitrate of the transmitted stream is lower than the channel bitrate after starting or random-accessing the streaming in order to start playback immediately and to achieve a buffer occupancy level that tolerates occasional packet delays and/or retransmissions. Bitrate adaptation may include multiple representation or layer up-switching and representation or layer down-switching operations taking place in various orders.

A decoder 1580 may be configured to perform switching between different representations e.g. for view switching, bitrate adaptation and/or fast start-up, and/or a decoder 1580 may be configured to select the transmitted representation(s). Switching between different representations may take place for multiple reasons, such as to achieve faster decoding operation or to adapt the transmitted bitstream, e.g. in terms of bitrate, to prevailing conditions, such as throughput, of the network over which the bitstream is conveyed. Faster decoding operation might be needed for example if the device including the decoder 1580 is multitasking and uses computing resources for other purposes than decoding the video bitstream. In another example, faster decoding operation might be needed when content is played back at a faster pace than the normal playback speed, e.g. twice or three times faster than conventional real-time playback rate.

In the above, some embodiments have been described with reference to resampling and/or rearranging. It needs to be understood that rearranging may comprise relocating, rotating, and/or mirroring even if they are not explicitly mentioned each time. It needs to be understood that the order of operations resampling, relocating, rotating, and mirroring may be pre-defined (e.g. in a coding standard) or may be indicated by an encoder in a bitstream and/or decoded by a decoder from a bitstream. It needs to be understood that more than one operation of the same type (e.g. resampling) may occur in the sequence of operations for the same region.

In the above, some embodiments have been described with reference to resampling and/or rearranging region(s) for forming reference pictures. It needs to be understood that in addition to or instead of resampling and/or rearranging the sample array(s) of the region(s), the motion fields of the region(s) may be similarly resampled and/or rearranged in various embodiments. The resampled and/or rearranged motion fields may then be used as a source for motion vector prediction, such as TMVP of HEVC or alike. Motion field resampling may be performed similarly as motion field mapping of inter-layer prediction used in spatial scalability, as described earlier. Relocating, rotating, and/or mirroring of motion fields can be performed similarly to the respective operations for sample arrays.

In the above, some embodiments have been described assuming monoscopic panorama video content. It needs to be understood that embodiments can be applied to stereoscopic content too, where partitions of two constituent frames are packed into the same frame to be coded.

In the above, some embodiments have been described with reference to the term block. It needs to be understood that the term block may be interpreted in the context of the terminology used in a particular codec or coding format. For example, the term block may be interpreted as a prediction unit in HEVC. It needs to be understood that the term block may be interpreted differently based on the context it is used. For example, when the term block is used in the context of motion fields, it may be interpreted to match to the block grid of the motion field.

In the above, some embodiments have been described in relation to HEVC and/or terms used in the HEVC specification. It needs to be understood that embodiments similarly apply to other codecs and coding formats and other terminology with equivalency or similarity to the terms used in the above-described embodiments.

In the above, where the example embodiments have been described with reference to an encoder, it needs to be understood that the resulting bitstream and the decoder may have corresponding elements in them. Likewise, where the example embodiments have been described with reference to a decoder, it needs to be understood that the encoder may have structure and/or computer program for generating the bitstream to be decoded by the decoder.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore, it is possible that the coder and decoder may share some or all common elements.

In the above, some embodiments have been described with reference to an encoder including indications into a bitstream and/or a decoder decoding indications from a bitstream. It needs to be understood that in addition to or instead of an encoder, another entity may include the indications into the bitstream, such as a sender 1530. It needs to be understood that in addition to or instead of a decoder, another entity may decode the indications from the bitstream, such as a receiver 1550. It needs to be understood that in addition to or instead of a bitstream, the indications may be included into or decoded from a container file and/or a media description, such as the Media Presentation Description (MPD) for Dynamic Adaptive Streaming over HTTP (DASH) or in the Session Description Protocol (SDP) describing an RTP session or stream.

Although the above examples describe embodiments of the invention operating within a codec within an electronic device, it would be appreciated that the invention as defined in the claims may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of the claims.

The invention claimed is:

1. An apparatus comprising at least one processor and at least one memory, said at least one memory having code stored thereon, which when executed by said at least one processor, causes the apparatus to perform at least:
   decode, from a bitstream, a first encoded region of a first equirectangular picture into a first preliminary reconstructed region;
   form a first reconstructed region from the first preliminary reconstructed region, wherein to form the first reconstructed region, the apparatus is further caused to:
   downsample the first preliminary reconstructed region;
   rearrange the downsampled first preliminary reconstructed region into a reconstructed picture as the first reconstructed region, wherein the apparatus being caused to rearrange the downsampled first preliminary reconstructed region comprises the apparatus being caused to relocate and at least one of rotate or mirror the downsampled first preliminary reconstructed region upon packing into a frame of the reconstructed picture; and
   decode at least a second region, wherein the first reconstructed region is used as a reference to predict decoding of the at least second region, and wherein the second region either belongs to a second equirectangular picture and is spatially collocated with the first reconstructed region or belongs to the first equirectangular picture.

2. An apparatus according to claim 1, wherein the apparatus is further caused to form the first reconstructed region on block basis or block row basis, and wherein the first reconstructed region comprises one or more blocks or one or more rows of blocks.

3. An apparatus according to claim 1, wherein the apparatus is further caused to:
   determine a sampling ratio for a region;
   decode an indication of a reference picture for the region;
   determine a set of reference pictures having the indication;
   determine one reference picture among the set of reference pictures based on said sampling ratio;
   decode a sample of said region using said one reference picture;
   decode, from the bitstream, a first sampling ration and a second sampling ratio; and
   store the decoded sample of said region in at least a first reference picture buffer and a second reference picture buffer along with the first sampling ratio and the second sampling ratio respectively.

4. An apparatus according to claim 3, wherein before said storing of samples to the first reference picture buffer, the apparatus is further caused to downsample the first preliminary reconstructed region to generate a downsampled preliminary reconstructed region, and wherein to store samples to the first reference picture buffer, the apparatus is further caused to downsample the first preliminary reconstructed region.

5. An apparatus according to claim 1, wherein the apparatus is further caused to:
   decode, from the bitstream, the first encoded picture into a preliminary reconstructed picture comprising a plurality of regions, wherein each region covers a subset of the preliminary reconstructed picture;
   from a first reconstructed picture from the preliminary reconstructed picture, wherein to form the first reconstructed picture, the apparatus is further caused to:
   downsample and rearrange at least a first region of the preliminary reconstructed picture;
   decode a second encoded picture, wherein to decode the second encoded picture the apparatus is caused to prediction from the first reconstructed picture.

6. An apparatus according to claim 5, wherein the apparatus is further caused to:
   obtain the preliminary reconstructed picture by decoding the first encoded picture in accordance with an intra picture decoding.

7. An apparatus according to claim 1, wherein at least one of said at least first region or said at least second region comprises at least one of the following:
   a top region of a vertical field of view of the preliminary reconstructed picture; or
   a bottom region of a vertical field of view of the preliminary reconstructed picture.

8. An apparatus according to claim 7, wherein the preliminary reconstructed picture comprises at least one top region of the vertical field of view, a middle region of the vertical field of view, and at least one bottom region of the vertical field of view.

9. An apparatus according to claim 8, wherein the preliminary reconstructed picture comprises the at least one top region of the vertical field of view, and the at least one bottom region of the vertical field of view as regionally downsampled and packed into a frame with the middle region of the vertical field of view.

10. An apparatus according to claim 1, wherein the apparatus is further caused to:
    decode an indication from the bitstream, about one or more of the following:
    location and size of regions within the preliminary reconstructed picture;
    rearranging instructions, including at least one resampling ratio for selected regions and locations of regions; or
    location and size of regions within the reconstructed picture; and
    determine, from the decoded indication, parameters for at least one of a regional downsampling or rearranging process to be applied.

11. An apparatus according to claim 1, wherein the apparatus is further caused to:
    decode a region from one or more complete slices, not containing coded data from other regions.

12. An apparatus according to claim 1, wherein the apparatus is further caused to:
    decode an indication from the bitstream, the bitstream comprising a slice header or a tile or tile set basis, about one or more of the following:
    at least one resampling ratio for the slice, tile, or tile set to be applied in the resampling process, or
    size of the slice, tile, or tile set within the reconstructed picture, or
    location for the slice, tile, or tile set within the reconstructed picture; and
    determine, from the decoded indication, parameters for at least of a regional downsampling or rearranging process to be applied.

13. An apparatus according to claim 1, wherein the apparatus is further caused to:
    decode a region from a tile or a tile set, not containing coded data from other regions.

14. A method for video decoding, the method comprising:
decoding, from a bitstream, a first encoded region of first equirectangular picture into a first preliminary reconstructed region;
forming a first reconstructed region from the first preliminary reconstructed region, wherein the forming comprises:
  downsampling the first preliminary reconstructed region; and
  rearranging the downsampled first preliminary reconstructed region into a reconstructed picture as the first reconstructed region, wherein rearranging the downsampled first preliminary reconstructed region comprises relocating and at least one of rotating or mirroring the downsampled first preliminary reconstructed region upon packing into a frame of the reconstructed picture; and
decoding at least a second region, wherein the first reconstructed region is used as a reference for predicting decoding of the at least second region, and wherein the second region either belongs to a second equirectangular picture and is spatially collocated with the first reconstructed region or belongs to the first equirectangular picture.

15. An apparatus comprising at least one processor and at least one memory, said at least one memory having code stored thereon, which when executed by said at least one processor, causes the apparatus to perform at least:
encode a first region of a first equirectangular picture comprising a plurality of regions, wherein to encode the apparatus is further caused to reconstruct a first preliminary reconstructed region corresponding to said first region;
form a first reconstructed region from the preliminary reconstructed region, wherein to form the apparatus is further caused to:
  downsample the first preliminary reconstructed region; and
  rearrange the downsampled first preliminary reconstructed region into a reconstructed picture as the first reconstructed region, wherein to rearrange, the apparatus is further caused to relocate and at least one of rotate or mirror the downsampled first preliminary reconstructed region upon packing into a frame of the reconstructed picture; and
encode at least a second region belonging to the first equirectangular picture or to a second equirectangular picture, wherein the first reconstructed region is used as a reference to predict encoding the at least second region.

16. An apparatus according to claim 15, wherein said the apparatus is further caused to form the first reconstructed region on block basis or block row basis.

17. An apparatus according to claim 15, the apparatus is further caused to:
determine a sampling ratio for a region;
indicate said sampling ratio in a picture sequence;
decode a set of initial samples based on said sampling ratio'
downsample the initial samples to a resolution of an output image;
store the downsampled samples in a decoded picture buffer; and
determine a reference picture for the region based on said sampling ratio such that the reference picture has the same sampling ratio as the sampling ratio of the region.

18. An apparatus according to claim 15, the apparatus is further caused to:
encode a first equirectangular picture, to encode the first equirectangular picture, the apparatus is further caused to reconstruct a preliminary reconstructed picture comprising a plurality of regions, each region covering a subset of the preliminary reconstructed picture;
form a first reconstructed picture from the preliminary reconstructed picture, wherein to form the first reconstructed picture the apparatus is further caused to downsample and rearrange at least a first region of the preliminary reconstructed picture;
form a processed second picture from a second equirectangular picture comprising a plurality of regions, each region covering a subset of the preliminary reconstructed picture, wherein to form processed second picture, the apparatus is further caused to downsample and rearrange at least a second region of the second picture, wherein the at least second region is spatially collocated with the at least first region and said downsampling and rearranging is performed similarly as for the preliminary reconstructed picture;
encode the processed second picture, wherein to encode the second processed picture the apparatus is further caused to prediction from the first reconstructed picture.

19. An apparatus according to claim 18, the apparatus is further caused to obtain the preliminary reconstructed picture by encoding the first equirectangular picture in accordance with an intra picture encoding method.

20. A method for video encoding comprising:
encoding a first region of a first equirectangular picture comprising a plurality of regions, wherein the encoding comprises reconstructing a first preliminary reconstructed region corresponding to said first region;
forming a first reconstructed region from the preliminary reconstructed region, wherein the forming comprises:
  downsampling the first preliminary reconstructed region; and
  rearranging the downsampled first preliminary reconstructed region into a reconstructed picture as the first reconstructed region, wherein the rearranging comprises relocating and at least one of rotating or mirroring the downsampled first preliminary reconstructed region upon packing into a frame of the reconstructed picture; and
encoding at least a second region belonging to the first equirectangular picture or to a second equirectangular picture, wherein the first reconstructed region is used as a reference for prediction in encoding the at least second region.

* * * * *

UNITED STATES PATENT AND TRADEMARK OFFICE
CERTIFICATE OF CORRECTION

PATENT NO. : 10,979,727 B2  
APPLICATION NO. : 16/307626  
DATED : April 13, 2021  
INVENTOR(S) : Hannuksela et al.

Page 1 of 1

It is certified that error appears in the above-identified patent and that said Letters Patent is hereby corrected as shown below:

In the Claims

Column 61,  
Line 48, Claim 3 "a first sampling ration" should read --a first sampling ratio--.

Column 62,  
Line 34, Claim 10 "bitstream, about" should read --bitstream about--;  
Line 50, Claim 12 "claim 1" should read --claim 11--.

Column 63,  
Line 35, Claim 15 "form the apparatus" should read --form, the apparatus--.

Signed and Sealed this  
Fifth Day of July, 2022

Katherine Kelly Vidal  
*Director of the United States Patent and Trademark Office*